US006604613B2

(12) United States Patent
Burgoon et al.

(10) Patent No.: US 6,604,613 B2
(45) Date of Patent: Aug. 12, 2003

(54) BRAKE HUB WITH FLOATING ROTOR AND MOUNTING FLANGE ALLOWING SIMPLIFIED ROTOR REMOVAL AND REPLACEMENT

(75) Inventors: Donald L. Burgoon, Gastonia, NC (US); Wenqi Qian, Fort Mill, SC (US); Sean E. Killeen, Charlotte, NC (US)

(73) Assignee: Performance Friction Corporation, Clover, SC (US)

( * ) Notice: Subject to any disclaimer, the term of this patent is extended or adjusted under 35 U.S.C. 154(b) by 0 days.

(21) Appl. No.: 10/131,037

(22) Filed: Apr. 25, 2002

(65) Prior Publication Data

US 2002/0157908 A1 Oct. 31, 2002

Related U.S. Application Data

(63) Continuation-in-part of application No. 09/895,412, filed on Jul. 2, 2001, which is a continuation-in-part of application No. 09/557,647, filed on Apr. 26, 2000, now Pat. No. 6,267,210.
(60) Provisional application No. 60/284,941, filed on Apr. 20, 2001, and provisional application No. 60/191,905, filed on Mar. 24, 2000.

(51) Int. Cl.⁷ .............................................. F16D 65/12
(52) U.S. Cl. ................................................ 188/218 XL
(58) Field of Search ........................... 188/18 A, 218 A, 188/218 XL, 218 R

(56) References Cited

U.S. PATENT DOCUMENTS 4,102,443 A     7/1978    Kohler et al.
4,662,482 A     5/1987    Bass
5,190,124 A     3/1993    Haneda
5,520,269 A     5/1996    Yamamoto et al.
5,788,026 A     8/1998    Poli
6,076,896 A     6/2000    Bertetti et al.
6,098,764 A     8/2000    Wirth et al.
6,116,386 A     9/2000    Martin

FOREIGN PATENT DOCUMENTS

DE     42 11 868 A1    10/1993
EP     0 127 932       12/1984
JP     50-42302        12/1975
JP     60-201127       10/1985
JP     9-166168         6/1997

*Primary Examiner*—Christopher P. Schwartz
(74) *Attorney, Agent, or Firm*—Pillsbury Winthrop LLP

(57) ABSTRACT

A hub rotor assembly includes a hub, a rotor supported by the hub and a plurality of fasteners that connect the rotor to the hub. The hub includes a wheel mounting flange and rotor mounting flange to which a flange of the rotor is attached. The rotor mounting flange has a larger diameter than the wheel mounting flange, or other hub elements outboard of the rotor mounting flange, so that the rotor can be easily removed from the hub. Features of the invention also include floatation elements associated with a fastener to fasten the rotor to the hub while allowing the rotor to move or float relative to the hub. A spring clip may be used with the floatation elements to prevent the rotor from rattling. The assembly is particularly suited for commercial highway vehicles and high performance vehicles.

46 Claims, 19 Drawing Sheets

FIG. 27
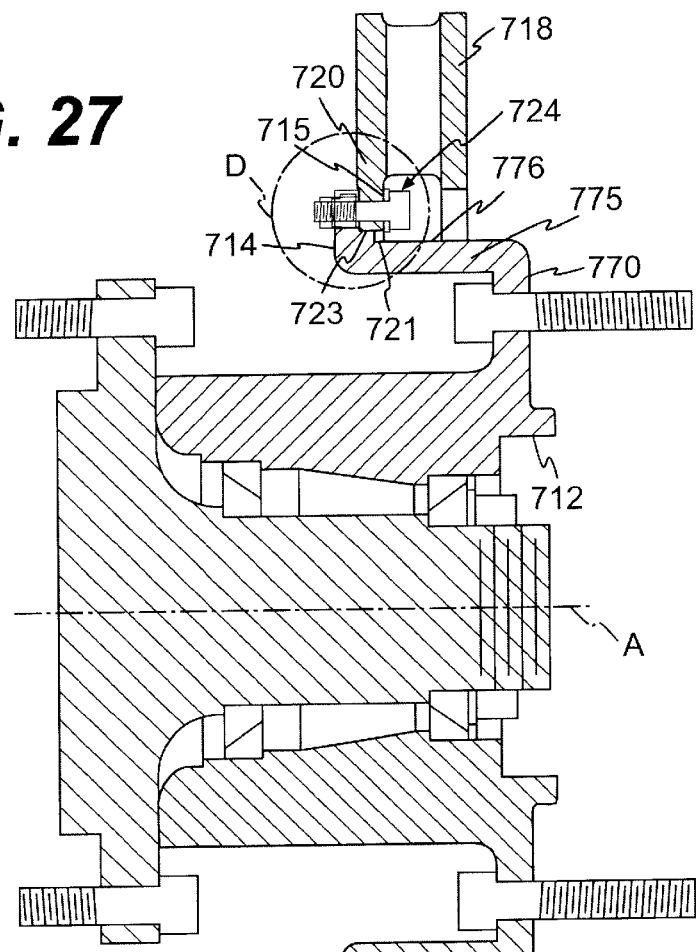
FIG. 28
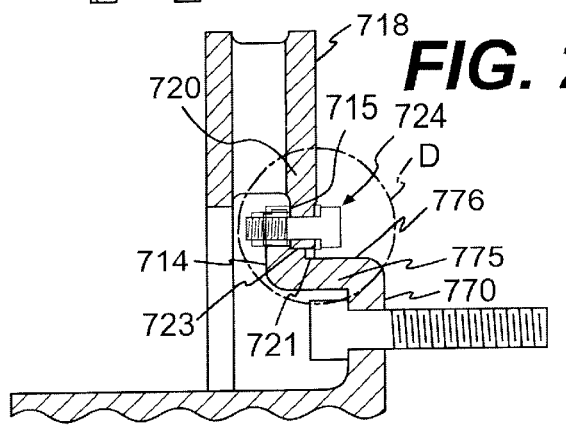
FIG. 29

BRAKE HUB WITH FLOATING ROTOR AND MOUNTING FLANGE ALLOWING SIMPLIFIED ROTOR REMOVAL AND REPLACEMENT

RELATED APPLICATIONS

This application is a Continuation-in-Part of U.S. patent application Ser. No. 09/895,412, filed Jul. 2, 2001, entitled BRAKE HUB WITH FLOATING ROTOR AND MOUNTING FLANGE ALLOWING SIMPLIFIED ROTOR REMOVAL AND REPLACEMENT, that claims priority to provisional application U.S. Ser. No. 60/284,941, filed Apr. 20, 2001, and which is a Continuation-in-Part of U.S. patent application Ser. No. 09/557,647, filed Apr. 26, 2000, now U.S. Pat. No. 6,267,210 entitled BRAKE HUB WITH FLOATING ROTOR that claims priority to provisional application U.S. Ser. No. 60/191,905, filed Mar 24, 2000. The above applications are incorporated herein by reference.

BACKGROUND OF THE INVENTION

1. Field of Invention

This invention relates to a brake assembly including a hub and rotor.

2. Description of Related Art

Prior brake designs are hat rotor hubs that use a hat rotor fixed to a brake hub, or integrated rotor hubs.

Integrated rotor hubs, as the name suggests, are constructions that integrate a rotor and a hub into a single element. These integrated rotor hubs are typically manufactured by known metal manufacturing methods such as sand casting. The hub and rotor are typically integrally cast. Subsequent to casting, the integrated rotor hub must be machined. The manufacturing costs of integrated hubs are considerable, as different vehicles each require a unique integrated hub design. Therefore, separate tooling and specific machining processes are also required for each integrated hub design.

In addition to the relatively high manufacturing costs of integrated rotor hubs, are high replacement costs. For example, a worn or cracked braking surface on the rotor requires the replacement of the entire hub. Such hub replacements are costly due to high labor costs and high material costs in replacing the entire integrated hub and rotor. The replacement of an integrated rotor hub requires the re-packing or re-installation of bearing assemblies that allow the hub to rotate about a wheel shaft. The bearing re-packing or re-installation procedures are labor intensive and are occasionally poorly performed. Poorly re-packed or reinstalled bearings result in excessive wear in the hub, shaft, and bearing. Poorly re-packed or re-installed bearings also result in excessive rotor run-out.

Rotor run-out is the rotational misalignment of the rotor. Specifically, rotor run-out is the measurement of the extent to which the rotor wobbles, or deviates outside the intended plane of rotation, as the rotor rotates with the hub about the wheel shaft. Rotor run-out causes excessive and uneven wear in the rotor braking surfaces and in brake pads which contact the rotor braking surfaces. Rotor run-out also increases thermal distortion of the brake rotor. The thermal distortion results in thermal judder, noise, and vibrations during braking, as well as causing irregular braking pulsations.

Hat rotor hubs have a hat rotor that is detachable from a hub. These hat rotors are typically one piece metal castings having a rotor portion integrally cast with a hat portion. The hat portion of the hat rotor is a large flange that fits over a mounting surface of the hub. The hat portion includes wheel stud apertures through which wheel studs can pass. The hat rotor is loosely mounted on the hub until a wheel is subsequently mounted on the hub. As wheel lug nuts are tightened to the wheel studs, the hat rotor is sandwiched between the wheel and the hub, thus securing the hat rotor to the hub.

Hat rotor hubs have an advantage over integrated rotor hubs. Hat rotors can be easily replaced when the brake surfaces of the rotor become worn or cracked, or the rotor becomes warped. However, hat rotors also have deficiencies.

A deficiency with hat rotor hubs results from the configuration of the typical hat rotor hub design. Hat rotors and hubs are typically individual metal castings. Subsequent to casting, the hat rotor and the hub must both be individually machined. The machined surfaces of the rotor hat portion, the rotor braking surfaces, and the mounting surface of the hub must all be in the proper plane to minimize rotor run-out. The rotor braking surfaces extend outwardly a considerable distance from the rotor hat portion. Consequently, the rotor braking surfaces also extend outwardly a considerable distance from the mounting surface of the hub, where the rotor hat portion is mounted on the hub. Should the mounting surface of the hub, or the hat portion, include an imperfectly machined surface, the rotor will have considerable run-out as it rotates. Stated differently, a small error in the machined surfaces of the mounting surface, or the rotor hat portion, will have a proportionally magnified effect on the rotational alignment of the rotor braking surfaces due to the large distance the rotor braking surfaces extend from the mounting surface.

Another deficiency with hat rotor hubs results from the manner in which a hat rotor and a wheel are mounted together on the hub. The hat rotor is installed over a mounting surface of the hub. The hat rotor is loosely mounted on the hub until a wheel is subsequently mounted on the hub. As wheel lug nuts are tightened to the wheel studs, the hat rotor is sandwiched between the wheel and the hub, thus securing the hat rotor to the hub. However, if the wheel lug nuts are not evenly tightened, the uneven forces acting on the hub may result in the distortion of the hub. Additionally, if the wheel rim has been improperly manufactured, the wheel rim might impose a distortion on the hub as the lug nuts are tightened. Any distortion on the hub will be directly transferred to the rotor, as the portion of the hub that is potentially distorted is also the mounting surface for the rotor in all hat rotor designs.

Additionally, as the hat rotor is loosely held on the hub when the wheel is removed, debris such as brake pad material or dirt can slip between the rotor hat portion and the mounting surface when the wheel is removed from the hub. Extraneous material in this location will obviously prohibit the hat portion from mating properly with the mounting surface of the hub. Extraneous material will cause the rotor to run-out as it rotates about the wheel spindle.

Another deficiency of hat rotor hubs is the requirement of a specific hat rotor for every hub. Consequently, specific casting tooling and specific machining steps are typically required for each hat rotor hub design. The cost of hat rotors is increased as the tooling, casting, and machining costs are greatly increased due to the large number of hat rotors that must be manufactured. Inventory costs are also correspondingly increased.

FIG. 20A is a partial side view in section of a prior art hat rotor hub assembly. Specifically, FIG. 20A shows a wheel shaft 1002, a hub 1012, which rotates about the wheel shaft 1002 through bearings 1009a and 1009b, a nut 1004 securing the hub 1012 to the wheel shaft 1012, and a hat rotor 1018 that includes a hat portion 1030 and opposing braking surfaces 1040 and 1042. The hub 1012 further includes a mounting surface 1013 and a plurality of wheel studs 1015 which extend outwardly from the mounting surface 1013. The hat portion 1030 of the hat rotor 1018 includes a mounting surface 1032 which mates with the mounting surface 1013. The hat portion 1030 also includes wheel stud passages 1034 through which the wheel studs 1015 pass. A wheel (not shown) is mounted on the hub outwardly of the hat portion 1030. The wheel (not shown) would contact the exterior surface 1033 of the hat portion 1030. A wheel lug nut (not shown) is used with each wheel stud 1015 to secure the wheel to the hub. Upon the securement of the wheel to the hub, the hat portion 1030 of the hat rotor 1018 is sandwiched between the wheel and the mounting surface 1013. However, when the wheel is removed, as is shown in FIG. 20A, the hat rotor 1018 is loosely held on the hub 1012.

The mounting of the wheel on the hub and the tightening of the lug nuts both may contribute to rotor run-out in this hub design. Both the rotor and the wheel are mounted at the same location on the hub (the mounting surface 1013). Should the mounting surface become distorted, the rotor will subsequently also become distorted. Unevenly tightened lug nuts may distort the mounting surface 1013. An improperly manufactured wheel rim (not shown) also could distort the hub mounting surface 1013, as the rim is tightened onto the hub.

FIG. 20A also shows the rotor braking surfaces 1040 and 1042 of the hat rotor 1018 are disposed at a considerable distance from the mounting surface 1013 on the hub 1012. Consequently, the rotor brake surfaces 1040 and 1042, the hat portion mounting surface 1032, and the mounting surface 1032 need to be properly machined so that the rotor braking surfaces 1040 and 1042 rotate in planes that are perpendicular to the rotational axis of the hub "A" with minimum run-out. Clearly, due to the considerable distance of the rotor braking surfaces from the mounting surface, a small error in any of the machined surfaces of the mounting surface, or the rotor hat portion, will have a proportionally magnified effect on the rotational alignment of the rotor braking surfaces causing run-out.

FIG. 20B is a partial side view in section of a prior art integral rotor hub assembly. Specifically, FIG. 20B shows a wheel shaft 1102, a hub 1112, which rotates about the wheel shaft 1102 through bearings 1109a and 1109b, a nut 1104 securing the hub 1112 to the wheel shaft 1112, and rotor 1118 that includes opposing braking surfaces 1140 and 1142. The rotor 1118 is integrally manufactured with the hub 1112, and is attached to the hub through the connecting element 1114. The hub 1112 further includes a wheel mounting surface 1113 and a plurality of wheel studs 1115 which extend outwardly from the wheel mounting surface 1113. A wheel (not shown) is mounted on the hub on the wheel mounting surface 1113. A wheel lug nut (not shown) is used with each wheel stud 1015 to secure the wheel to the hub.

Another deficiency of both integrated rotor hubs and hat rotor hubs is that the rotor in both of these designs is fixed with respect to the hub. Consequently, the rotor must be carefully balanced to avoid uneven wear and compromised performance. During braking, the rotor in such an assembly is subjected to high frictional forces that generate heat in the rotor causing thermal expansion/distortion, temperature variation across the face of the rotor, and heat transfer to the adjacent components including the hub and the bearings. Heat transferred to the bearings will cause distortions reducing the bearing performance. Bearing grease will also break down more rapidly under high heat situations.

When the rotor is fixed with respect to the hub, thermal expansion of the rotor is very limited because of the integral connection between the rotor and the hub. This creates thermal coning in the rotor surface and a large thermal gradient, which will induce high thermal stress leading to thermal cracking. The high thermal gradient generated during braking and the effects of the thermal expansion and distortion can cause vibration and thermal judder across the brake surfaces, resulting in a rough or irregular braking pulsations. The high thermal stress and thermal distortion also reduce the life and performance of the rotor and increase maintenance costs.

Particularly in high performance and commercial braking applications, braking performance is especially stringent and closely monitored. It is important in such applications to provide a braking assembly that provides enhanced performance at low maintenance and replacement costs.

SUMMARY OF THE INVENTION

One aspect of embodiments of the invention is to provide a braking assembly that is suitable for use on commercial vehicles, especially highway vehicles with a gross vehicle weight (GVW) of 5000 pounds or more and high performance vehicles.

Another aspect of embodiments of the invention is to provide a rotor that can be manufactured separately from a hub and which may be easily removed from the hub for replacement. Lower maintenance costs can be realized by this invention by allowing replacement of the rotor without a hub change. This eliminates the disturbance of wheel bearings, as well as the labor intensive replacement or re-packing of wheel bearings.

Another aspect of embodiments of the invention is to provide a hub and rotor where the rotor mounts to the hub independent of the wheel. Specifically, an aspect of embodiments of the invention is to provide a hub having a rotor mounting flange and a rotor which is mounted to a rotor mounting flange. The independent mounting of the rotor and a wheel to the hub rotor assembly of the present invention ensures that the rotor run-out will be unlikely to result from unevenly tightened lug nuts or an improperly manufactured wheel.

Also as a result of the independent mounting of the rotor and the wheel, wheel removal does not affect the mounting of the rotor to the hub. Consequently, upon removal of the wheel from the hub there is no potential for debris or other extraneous matter to become lodged between the rotor and the hub, causing rotor run-out.

Another aspect of embodiments of the invention is to provide a rotor design having simplified manufacturing compared to hat rotor hubs and integral rotor hubs. Specifically, an aspect of embodiments of the invention is to provide a hub having a rotor mounting flange and a rotor, which is mounted to the rotor mounting flange. This hub and rotor configuration provides a rotor that is as easily removable from the hub as a hat rotor, but does not have the deficiencies of a hat rotor. And, as there is no hat portion on the rotor, different rotors do not vary considerably in shape from one another. Consequently, unlike hat rotors and integral rotor hubs, a large number of rotors may be machined from a single rough casting. Tooling and manufacturing costs are greatly decreased as a result of this design. Additionally, as the rotor and the hub are manufactured separately, the hub and rotor can have different material specifications for optimal cost and performance.

Another aspect of embodiments of the invention is that the rotor is not integrated with the hub and, therefore, heat generated on the rotor during braking is not transferred directly to the hub and the bearings, resulting in reduced bearing performance.

Another aspect of embodiments of the invention is that the rotor and hub of the invention may be designed to use a variety of different fasteners for attachment of the rotor to the hub.

Another aspect of embodiments of the invention is to provide a rotor that floats with respect to the hub. An additional aspect of these embodiments of the invention is to reduce first and second order thermal distortion by allowing the rotor to thermally expand. Embodiments of the invention provide a design that significantly reduces the temperature variation and thermal distortion across the rotor surface. This design can reduce thermal fatigue and prolong the life of the rotor.

Another aspect of embodiments of the invention is to use a floatation element with each fastener to allow the rotor to float or move with respect to the hub. The element can be made of a material resistant to corrosion and having low thermal conductivity so as to be viable for commercial highway vehicles. The invention can reduce vibration and thermal judder across brake surfaces to ensure a smooth pedal feel during automobile or other vehicle braking applications.

A further aspect of embodiments of the invention is to provide a spring clip spacer in association with the flotation element. The spring clip spacer allows floatation of the rotor to occur relative to the hub, which eliminates rattling noises.

Another aspect of embodiments of the invention is that the spring clip spacer can serve as a heat shield between the rotor and the hub. The spring clip spacer may be manufactured from such metals as stainless steel that have low heat conductivity. Consequently, heat generated in the rotor is less likely to be transferred to the hub and the bearings.

Another aspect of embodiments of the invention is that the spring clip spacer may be manufactured from metals such as stainless steel that minimize the potential for corrosion. The spring clip spacer separates the floatation element from the hub rotor mounting flange slot within which it is disposed and minimizes any corrosion, galvanic corrosion, galling, etc. that might occur on or between the floatation element and slot. Such corrosion, galling etc. can eliminate rotor floatation or diminish the performance of the rotor floatation. This feature is of particular significance in road vehicles as opposed to race vehicles, as a rotor may remain mounted on a hub of a road vehicle without disassembly for a number of years, race vehicles typically have each mechanical component removed for inspection following each race. Consequently there is little chance of corrosion or galling to occur. Additionally, road vehicles, are subject to road salt and other chemicals, which accelerate corrosion considerably.

Another aspect of embodiments of the invention is that the spring clip spacer minimizes the Brinell effect of the floatation element of the hub rotor-mounting flange. The floatation element is typically constructed from corrosion resistant alloys having a hardness considerably higher than the hub, which is typically constructed from aluminum or an aluminum alloy. As the floatation element floats within the slots of the hub rotor-mounting flange, the harder floatation element dents and scores the slot. This Brinell effect type of denting and scoring alters the clearances between the floatation element and the slot, thus altering the floatation of the rotor. The spring clip of the present invention separates the floatation element from the slot and prohibits the floatation element from contact with the slot. Consequently, no Brinell effect denting or scoring of the slot will occur. This feature is also of significant importance in road vehicles where the rotor may remain attached to the hub for considerable periods of time. The cumulative effect of Brinell effect denting and scoring over a long period of time may result in significant deterioration within the slots of the hub rotor mounting flange. Such Brinell effect denting and scoring are problematic in race vehicles, as well. However, the frequent inspections and parts replacements that are common place in race vehicles diminishes the cumulative effect of Brinell effect denting and scoring.

Another aspect of embodiments of the invention is that the spring clip spacer provides protection to the hub in situations where the floatation element is manufactured from a metal which is harder than a metal used to manufacture the hub. The spring clip spacer assists in the provision of floatation to the rotor, but minimizes the potentially damaging contact the harder floatation element can impart on the hub. Accordingly, there is little chance that the hub slots within which the floatation elements and the spring clip spacers are disposed will increase in size as a result of the floatation.

These and other aspects and advantages of the invention can be realized by the various embodiments of the hub rotor assembly of the invention. Other objects, aspects, and advantages of the embodiments of the invention will become apparent from the detailed description taken in conjunction with the drawings.

BRIEF DESCRIPTION OF THE DRAWINGS

Referring to the drawings that form part of this disclosure:

FIG. 27 is a partial side view in section of another embodiment of the rotor and hub assembly fastened together;

FIG. 28 is an enlarged view of a portion of FIG. 27, shown in circle D, showing the details of the fastener assembly;

FIG. 29 is a partial side view of an alternate mounting arrangement;

DETAILED DESCRIPTION OF PREFERRED EMBODIMENTS

Figure 1:
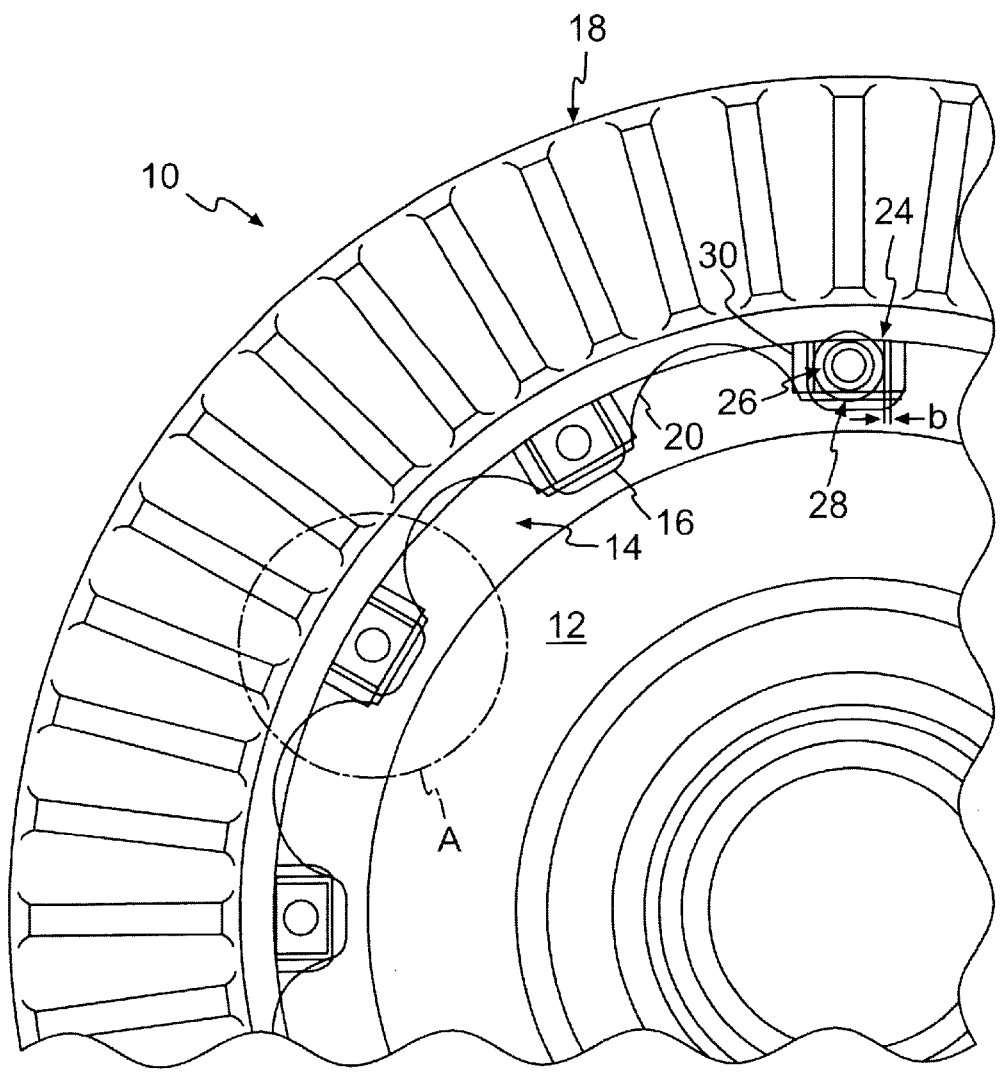
FIG. 1 is partial front schematic view of a brake rotor and hub assembly in accordance with an embodiment of the invention.

In the description below of FIGS. 1 through 12, reference numerals for the same elements remain the same in each figure.

Figure 2:
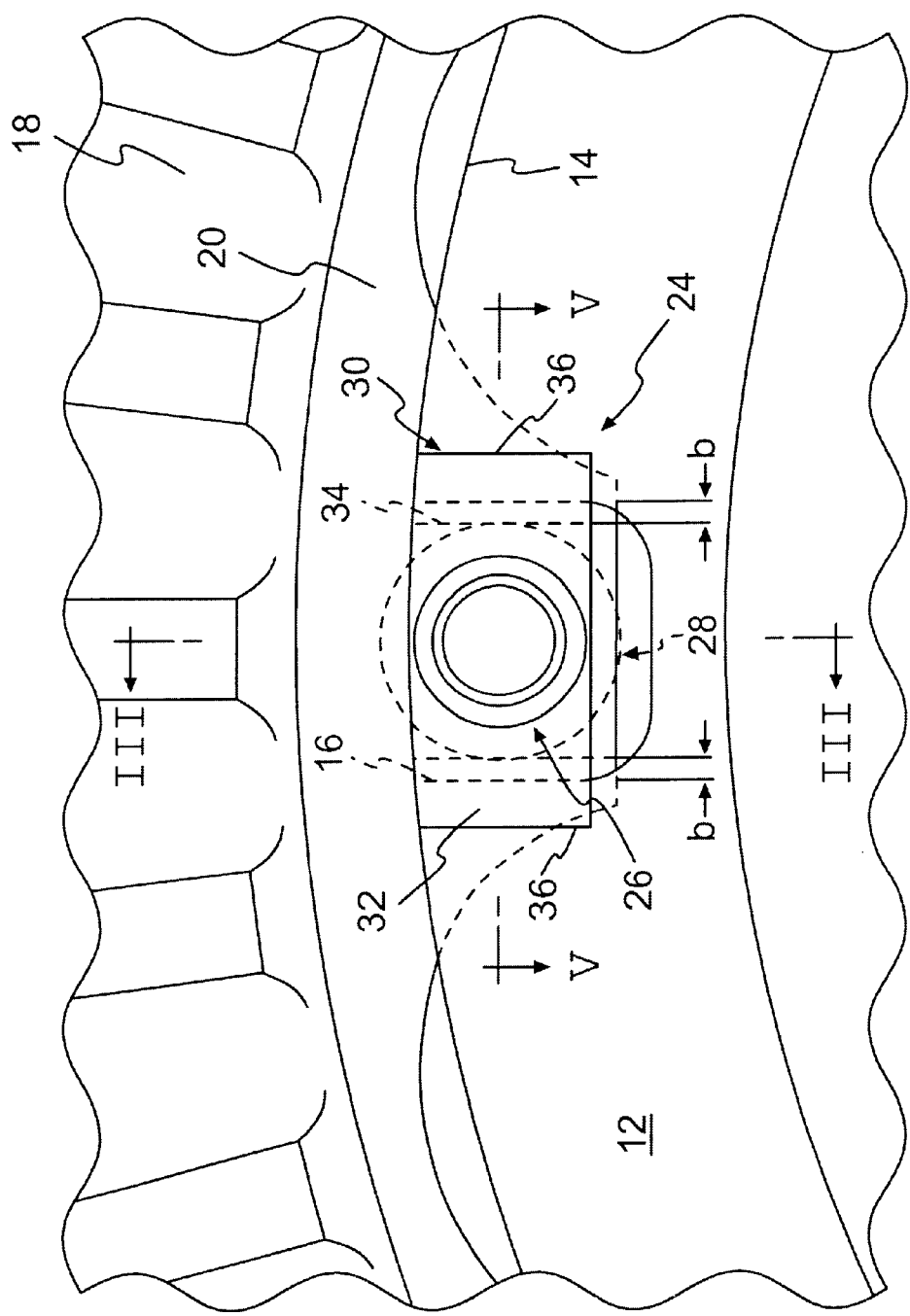
FIG. 2, is an enlarged view of a portion of FIG. 1 shown in circle A showing the details of the fastener assembly.

As seen in FIGS. 1 and 2, assembly 10 includes a hub 12, also referred to as a hat, that has a flange 14. Flange 14 has a plurality of slots 16 formed therein. Each slot 16 is generally square shaped and opens outwardly with respect to the axis of rotation of hub 12. The slot can, of course, be any shape suitable for receiving a fastener.

The hub 12 can be made of any conventional material, and is preferably made of cast iron, classes GG 20–40, depending on the desired application and cost considerations.

Figure 3:
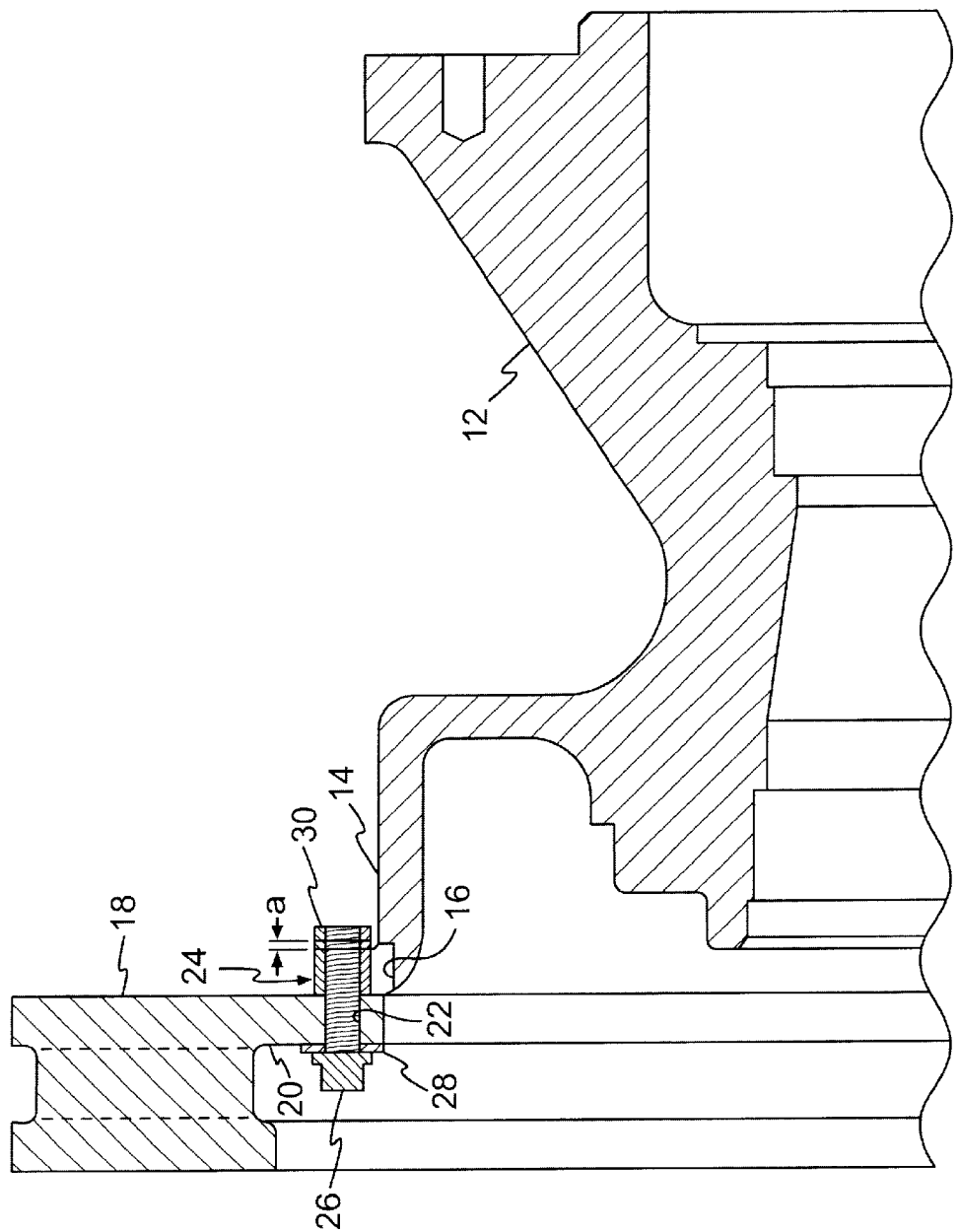
FIG. 3 is a partial side view in section of the rotor and hub assembly fastened together taken along line III—III in FIG. 2.
Figure 4:
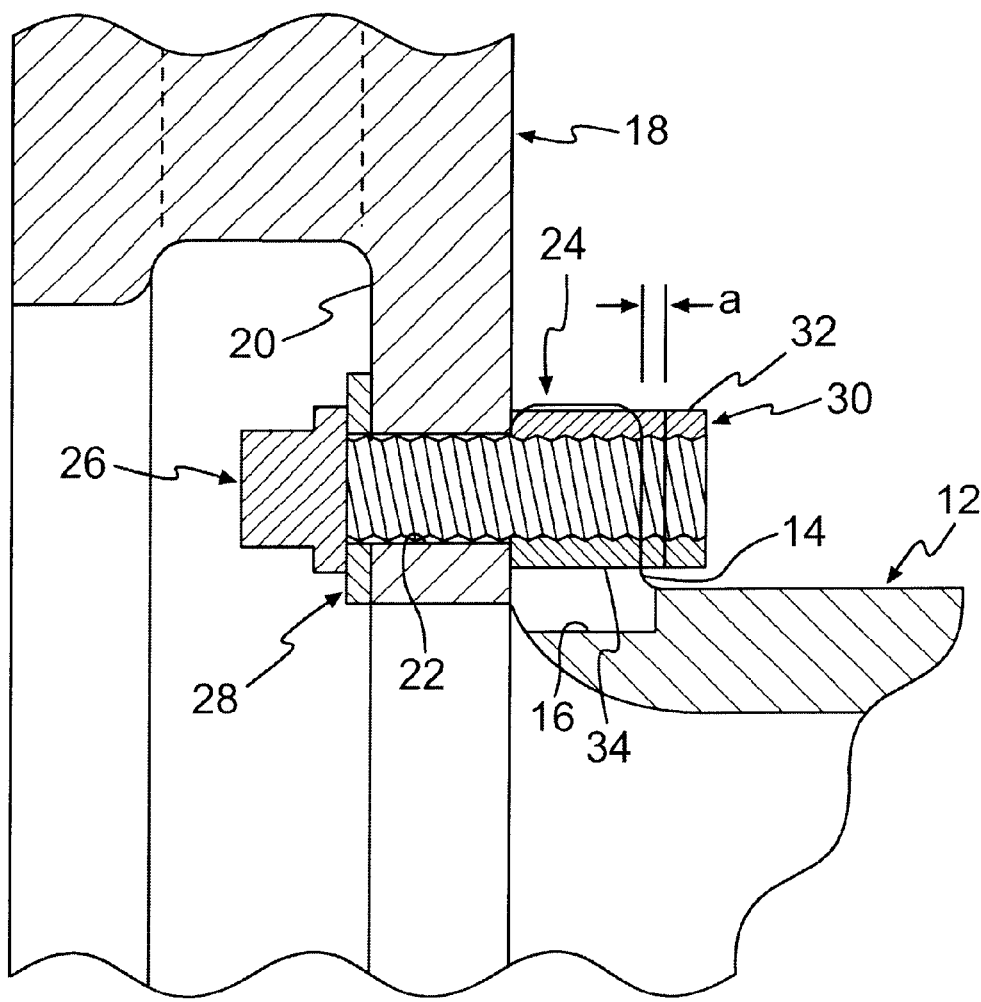
FIG. 4 is an enlarged view of the fastener assembly of FIG. 3.

A rotor 18 having a generally annular shape is fastened to hub 12. Rotor 18 can be of any known form used for braking. As shown in FIG. 3, rotor 18 has flange 20 that confronts hub flange 14. Flange 20 has a plurality of openings 22 therein for receiving fasteners. Rotor 18 is connected to hub 12 such that the axis of rotation of rotor 18 is aligned with, or the same as, the axis of rotation of hub 12.

The rotor 18 can be made of any conventional material, and is preferably made of cast iron with an alloy that can increase thermal performance, depending on the desired application and wear and cost considerations.

Rotor 18 is connected to hub 12 by a fastener assembly 24. Fastener assembly 24 includes a threaded bolt 26, a washer 28 and a floatation element 30. Floatation element 30 is preferably a bobbin having a polygonal head 32, shown in FIG. 2 for example as a rectangle, and a hollow, internally threaded, polygonal, tubular body 34. Of course, body 34 can be any desired shape, but preferably the external shape complements the opening 16 in hub 12, or an opening in rotor 18, in which bobbin 30 is retained. Body 34 can also have a through-hole with no threading, in which case a nut would be employed to retain bolt 26, as described below. Head 32 is integrally attached to body 34 and extends past body 34 on each side with outwardly extending flanges 36. Any suitable number of fastener assemblies 24 can be used, often depending on the size of the rotor 18 and the particular application.

In the embodiments shown in FIGS. 5–8, bobbin 30 is preferably sized such that bolt 26 does not extend from bobbin body 34 when assembled. Bobbin head 32 is sized to extend beyond the edges of slot 16 to prevent bolt 26 from becoming disengaged with rotor 18 and hub 12. Bobbin body 34 is sized to have a greater length than the width of hub flange 14, thus creating a floating clearance "a" clearly shown in FIGS. 4 and 5. Floating clearance "a" can be any distance that accommodates thermal expansion/distortion of rotor 18, and is preferably about 0.003 to 0.009 inches. Bobbin body 34 also has a width that is less than the width of the slot 16, thus creating a floating clearance "b" clearly shown in FIGS. 2 and 5. The floating clearance "b" is shown as being divided into separate clearances on either side of bobbin body 34, but may occur on either or both sides in equal or unequal divisions. Both of these clearances are added to obtain the total clearance "b". The total floating clearance "b" can be any distance that accommodates thermal expansion/distortion of rotor 18, and is preferably about 0.002 to 0.014 inches.

Bobbin 30 can be made of any material suitable for commercial braking applications, and preferably has a low rate of thermal transfer and is corrosion resistant, such as stainless steel or powdered metal stainless steel.

Figure 5:
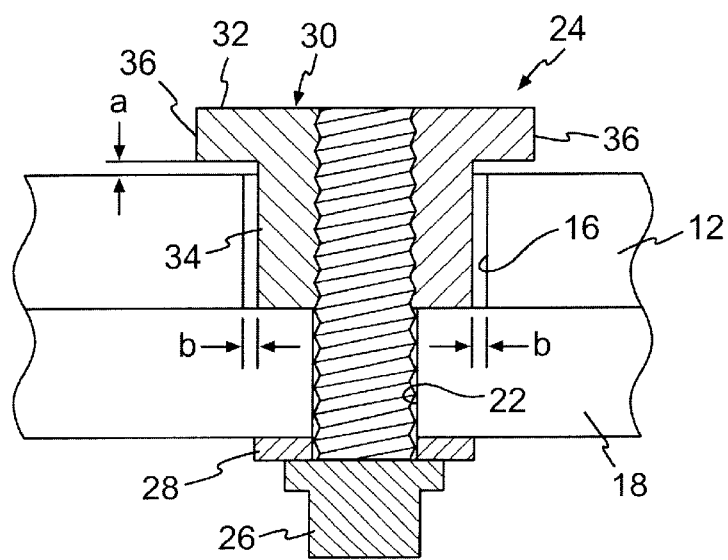
FIG. 5 is an enlarged back view in section of the fastener assembly of FIG. 1 taken along line V—V in FIG. 2.
Figure 6:
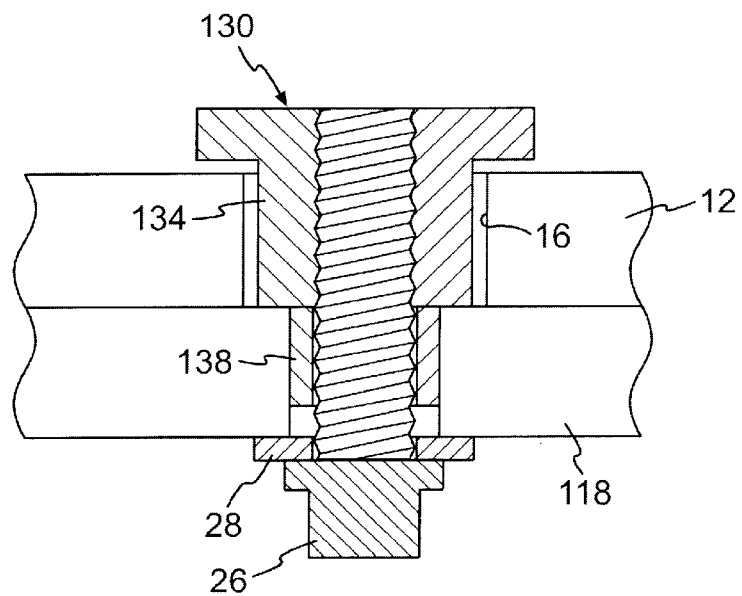
FIG. 6 is an enlarged back view in section of a modification of the embodiment of the fastener assembly shown in FIG. 5, in which the fastener assembly uses a cylindrical bushing.

In FIG. 5, bobbin 30 is shown as being retained in slot 16 of hub 12. FIG. 6 shows a modification of the fastener assembly of FIG. 5.

As best shown in FIG. 6, bobbin 130 has an integral cylindrical bushing 138 extending from body 134. By this, bobbin 130 extends into hub 12. Such a bushing 138 ensures a precise connection between the rotor 118 and the hub 12, which can be difficult to obtain with conventional bolts that can vary slightly in size. It is also possible to use a bobbin 130 that extends through both the rotor 118 and the hub 12 creating an entire floating connection in which clearance is provided adjacent both the rotor 118 and the hub 12, if desired.

Figure 7:
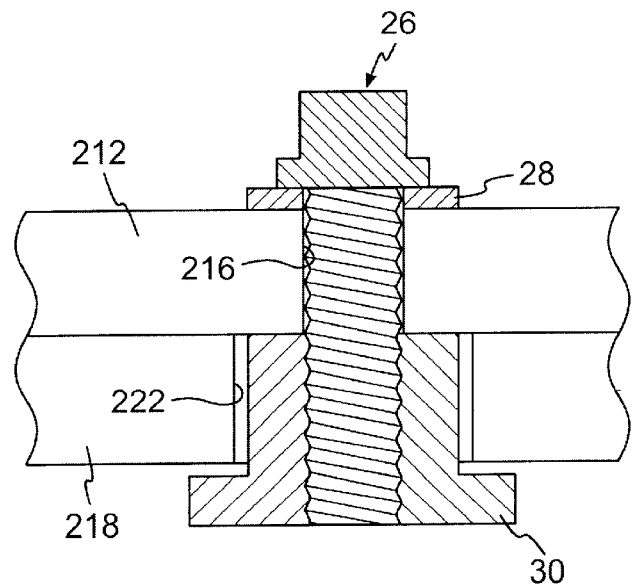
FIG. 7 is an enlarged back view in section of another embodiment of the fastener assembly.

FIG. 7 illustrates an alternative embodiment of the fastener assembly. Bobbin 30 is shown as being retained in slot 222 of rotor 218, rather than in slot 16 of hub 12 as in the previous embodiment. Fastening is achieved in the same manner with a bolt 26 extending through slot 216 in hub 212 and engaging with bobbin 30.

Figure 8:
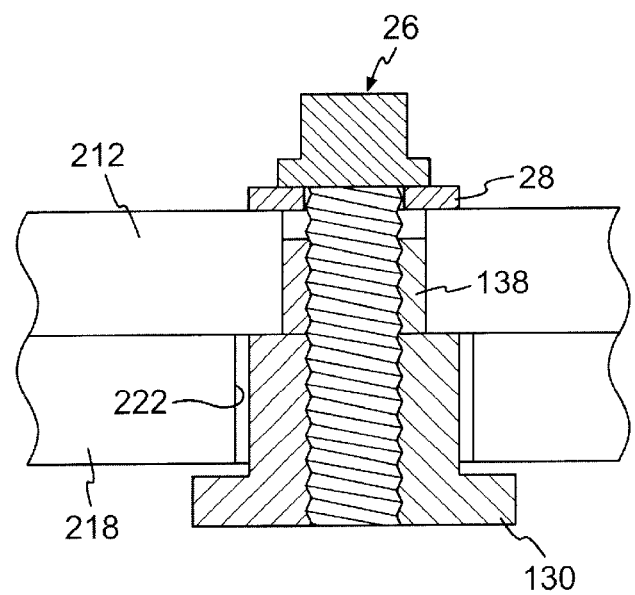
FIG. 8 is an enlarged back view in section of a modification of the embodiment of the fastener assembly shown in FIG. 7 with a cylindrical bushing.

FIG. 8 shows bobbin 130 being retained in slot 222 of rotor 218. Bobbin 130 has an integral cylindrical bushing 138, similar to the bobbin 130 of FIG. 6. Bobbin 130 extends into hub 212 by way of cylindrical bushing 138. Such a bushing 138 ensures a precise connection between rotor 218 and hub 212.

Figure 9:
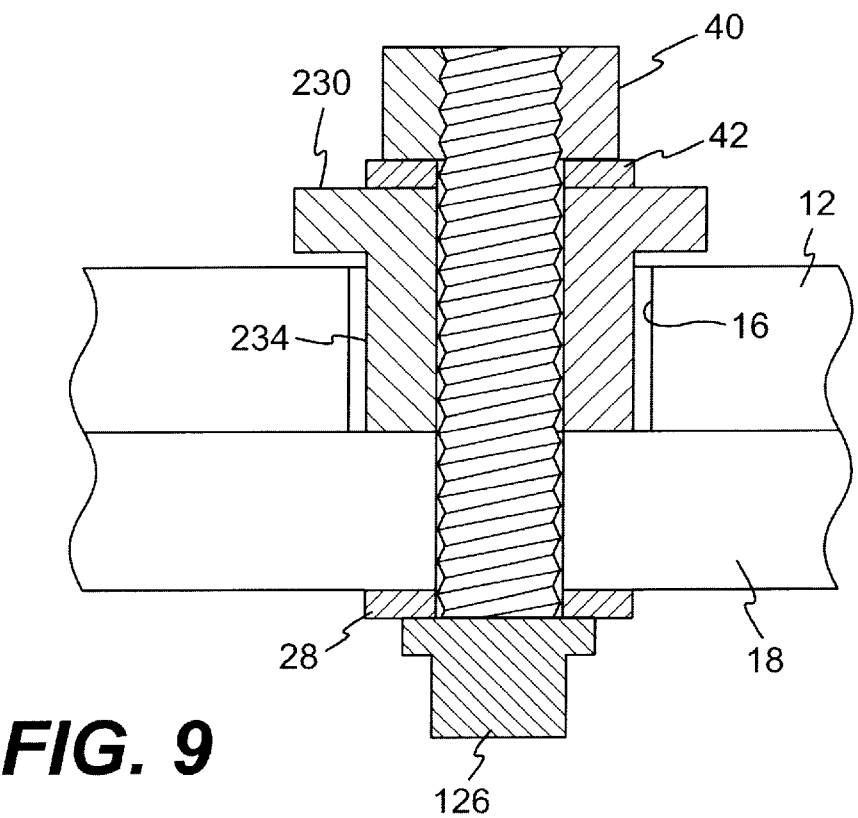
FIG. 9 is an enlarged back view in section of a further embodiment of the fastener assembly with a nut.

FIG. 9 illustrates another embodiment of the fastener assembly. Bobbin 230 is retained in slot 16 of hub 12. In this case, bobbin 230 has a smooth central bore with no threads and bolt 126 is larger than bolt 26 in the prior embodiments. Body 234 has a through-hole with no threading such that a nut 40 is employed to retain bolt 126. Bolt 126 enters rotor 18 with the bolt head 126 positioned on the rotor side. Bolt 126 extends beyond the hub 12 and is secured with a nut 40 and washer 42.

Figure 10:
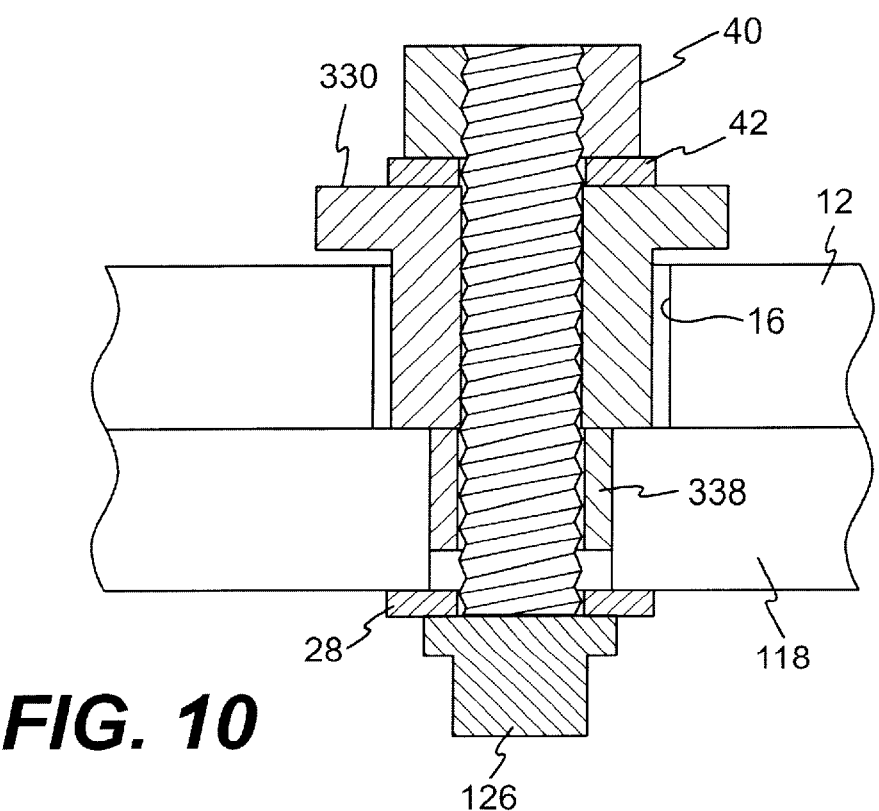
FIG. 10 is an enlarged back view in section of a modification of the embodiment of FIG. 9 showing a cylindrical bushing.

FIG. 10 shows bobbin 330 having an integral cylindrical bushing 338, similar to the bobbin 130 of FIGS. 6 and 8. Bobbin 330 extends into rotor 118 by way of cylindrical bushing 338. Bolt 126 holds bobbin 330 in slot 16 of hub 12 when secured with nut 40 and washer 42.

Figure 11:
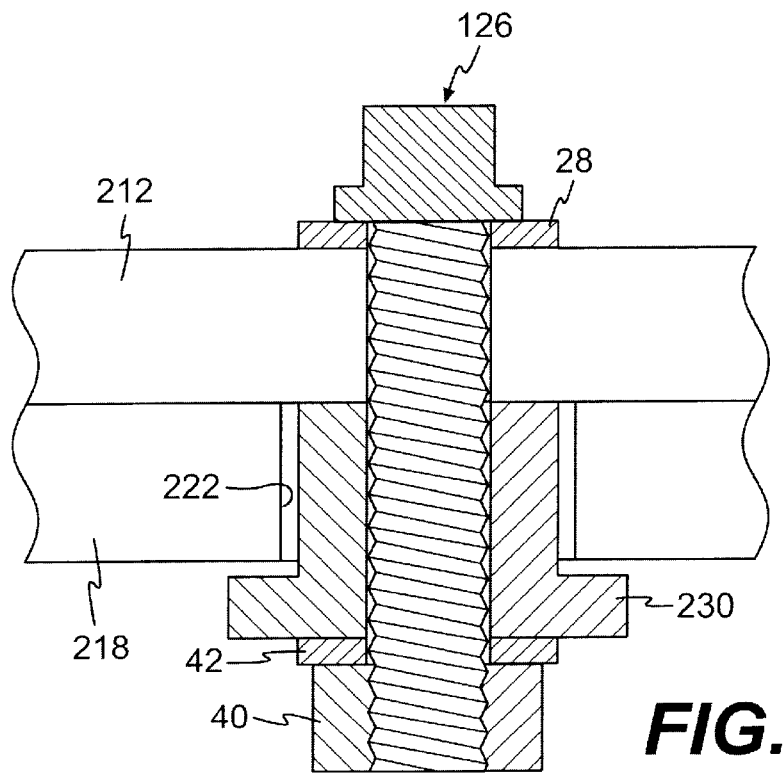
FIG. 11 is an enlarged back view in section of an additional embodiment of the fastener assembly with a nut.

FIG. 11 illustrates yet another embodiment of the fastener assembly. Bobbin 230 is retained in slot 222 of rotor 218. As described above, bobbin 230 has a smooth central bore with no threads, and bolt 126 is larger than bolt 26 in the prior embodiments. Bolt 126 is shown as entering hub 212 with the bolt head positioned on the hub side. The bolt 126 is sized to extend beyond rotor 218 and is secured with nut 40 and washer 42.

Figure 12:
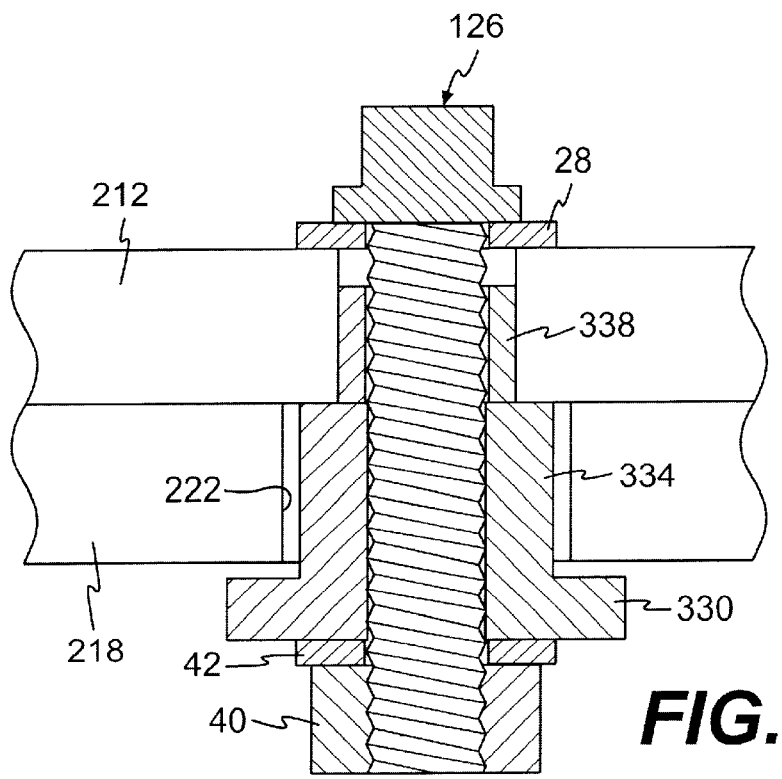
FIG. 12 is an enlarged back view in section of a modification of the fastener assembly of FIG. 11 with a cylindrical bushing.

FIG. 12 shows bobbin 330 extending into hub 212 by way of cylindrical bushing 338. Body 334 has a through-hole with no threading such that nut 40 is employed to retain bolt 126. Bolt 126 retains bobbin 330 in slot 222 of rotor 218 when secured with nut 40 and washer 42. As shown by the various embodiments, reversing insertion of the bolt 126 may be particularly advantageous depending on the particular application to facilitate assembly and access.

Upon assembly, openings 22 in rotor flange 20 are aligned with slots 16 in hub flange 14. A bobbin 30 is inserted in either rotor opening 22 or hub slot 16. The flanges 36 of bobbin head 32 extend beyond the edges of the corresponding opening 22. A bolt 26, preferably, but not necessarily, with washer 28, is inserted through the aligned opening 22 and slot 16, from the element opposed to the element that receives the bobbin 30. For example, when bobbin 30 is received in hub 12, as shown in FIG. 5, bolt 26 is first inserted through opening 22 in rotor 18. Bolt 26 is threaded into bobbin body 34 to securely attach rotor 18 to hub 12. Alternatively, as described above, bolt 26 is inserted through bobbin 230, for example, and retained by nut 40, and, if desired, washer 42.

During operation, rotor 18 rotates with hub 12. Upon braking, rotor 18 is permitted to slightly move with respect to hub 12, due to clearances "a" and "b". Movement can be due to thermal expansion/distortion or rotational torque. Rotor 18 can move rotationally to the left and right, as seen in FIG. 2, such rotationally movement being parallel to the axis of rotation. Rotor 18 can also move axially up and down, as seen in FIG. 5, such axial movement being perpendicular to the surface of the rotor 18. Rotor 18 does not move appreciably in a manner where the radial distance of the rotor 18 from the axis of rotation of the hub 12 changes. Thus, the axis of rotation of rotor 18 remains aligned with the axis of rotation of hub 12. However, radial expansion of the rotor 18 is permitted, due to the clearances "a" and "b". The movement of the rotor 18 with respect to the hub 12 allows the rotor to "float" with respect to the hub 12. This movement is present with each of the above described embodiments.

Figure 13:
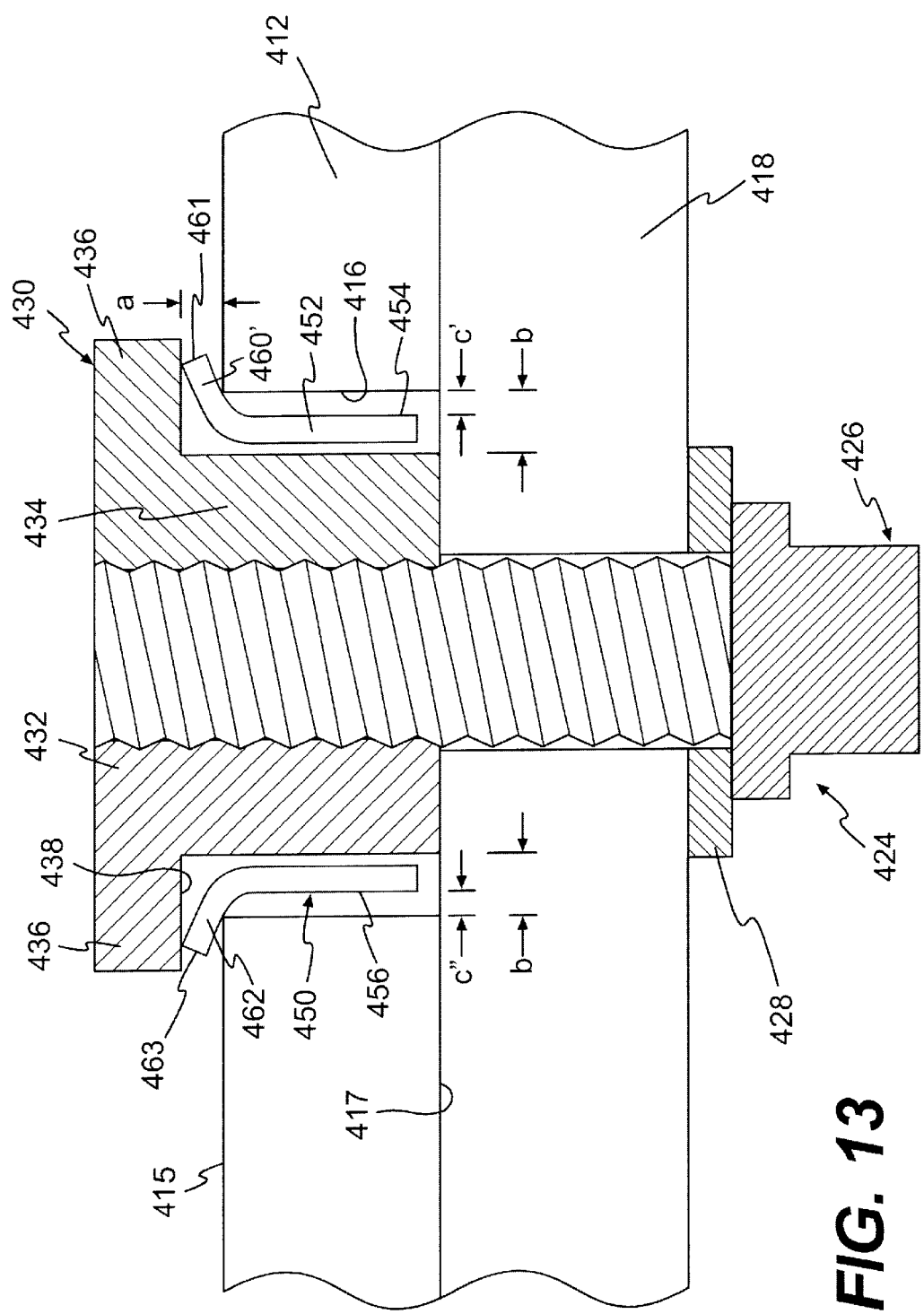
FIG. 13 is an enlarged back view in section of an additional embodiment of the fastener assembly with a spring clip spacer.

FIG. 13 is an enlarged back view in section of an additional embodiment of the fastener assembly used in embodiments of the hub and rotor assembly of the present invention. FIG. 13 shows a hub 412, which includes a slot 416, a rotor 418, and a fastener assembly 424 that is used to fasten the rotor 418 to the hub 412. The slot 416 includes substantially parallel opposing slot surfaces 416a and 416b. The fastener assembly 424 includes a bolt 426, a bobbin 430, a washer 428, and a spring clip spacer 450. The hub 412 includes a flange outer surface 415 disposed opposite the rotor 418, and a flange inner surface 417 facing the rotor 418. The bobbin 430 includes a bobbin body 434 and a head 432 having outwardly extending flanges 436. The outwardly extending flanges 436 include bottom surfaces 438. As was described in previous embodiments, the bobbin 430 is a floatation element. The bobbin body 434, as shown, preferably has an internally threaded, tubular rectangular shape. However, as was previously shown in FIG. 9, an unthreaded bobbin may be used with a nut.

Figure 14:
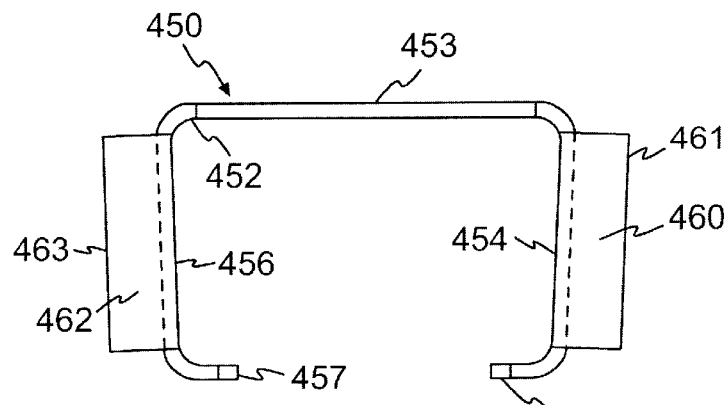
FIG. 14 is a top view of the spring clip spacer of the fastener assembly of FIG. 13.

FIG. 14 shows the elements of the spring clip spacer 450 in a top view. The spring clip spacer 450 includes a collar 452 that is sized and configured to surround the exterior peripheral surface of a bobbin body (434 in FIG. 13). The collar 452 includes a main portion 453, a first side portion 454 having a distal end 455, and a second side portion 456 having a distal end 457. The collar 452 is a clip portion of the spring clip spacer 450. A first flange extension 460, which includes a distal end 461, extends from the first side portion 454. A second flange extension 462, which includes a distal end 463, extends from the second side portion 456. The flange extensions 460 and 462 comprise a spring portion of the spring clip spacer 450.

Figure 15:
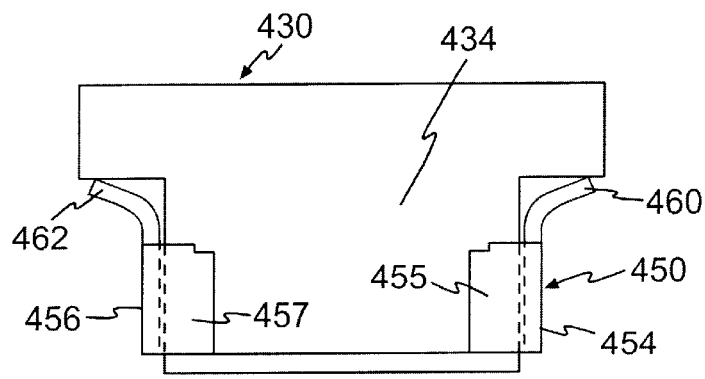
FIG. 15 is a front view of a spring clip spacer disposed on a floatation element of the fastener assembly of FIG. 13.

FIG. 15 is a front view showing the bobbin 430 and the spring clip spacer 450 of the fastener assembly 424 of FIG. 13. The spring clip spacer 450 is disposed partially around the exterior peripheral surface of the of the bobbin body 434. The flange extensions 460 and 462, as well as the distal ends 455 and 457 of the collar side portions 454 and 456 are also shown in their preferred positions relative to the bobbin 430. The distal ends 455 and 457 of the collar side portions ensure that the spring clip spacer 450 remains disposed on the bobbin 430 at all times, regardless of the hub and slot configuration.

Figure 16:
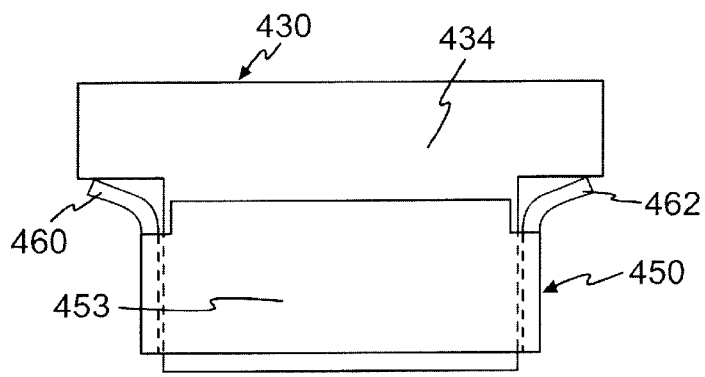
FIG. 16 is a back view of a spring clip spacer disposed on a floatation element of the fastener assembly of FIG. 13.

FIG. 16 is a back view showing the bobbin 430 and the spring clip spacer 450 of the fastener assembly of FIG. 13. The collar main portion 453 is shown covering the bobbin body 434.

Returning to FIG. 13, a floating clearance "b" separates the bobbin body 434 from the slot 416. The spring clip spacer first and second side portions 454 and 456 are disposed within the clearance "b". A floating clearance "c" separates the spring clip spacer first and second side portions 454 and 456 from the slot 416. A floating clearance "a" separates the flange outer surface 415 of the rotor 412 from the bottom surfaces 438 of the outwardly extending flanges 436 of the bobbin 430. Floating clearances "a" and "c" are sized to accommodate the floatation of the bobbin 430 with the spring clip spacer within the slot 416.

Floating clearance "a" can be any distance that accommodates thermal expansion/distortion of rotor 18, and is preferably about 0.003 to 0.014 inches. The floating clearance "c" is shown as being divided into separate clearances on either side of bobbin body 340, but may occur on either or both sides in equal or unequal divisions. Both of these clearances are added to obtain the total clearance "c". The total floating clearance "c" can be any distance that accommodates thermal expansion/distortion of rotor 18, and is preferably about 0.002 to 0.008 inches.

The spring clip spacer flange extensions 460 and 462 extend angularly from the collar 452 across the floating clearance "c" and across the floating clearance "a". The flange extensions 460 and 462 extend from a first position within the slot 416 to a second position outside of the slot 416. The flange extension distal ends 461 and 463 preferably contact the bottom surfaces 438 of the outwardly extending flanges 436. It would also be possible to extend the flange extensions 460 and 462 past the outwardly extending flanges 436, if desired.

As the bobbin 430 is shown in FIG. 13 attached to the rotor 418, the floatation of the bobbin 430 within the slot 416 allows the rotor to move radially, axially, and rotationally relative to the axis of rotation of the hub. In this embodiment, the inclusion of the spring clip spacer 450 between the bobbin 430 and the slot 416 results in a situation where elastic deformation of the flange extensions 460 and 462 preferably must occur to allow this movement. Stated differently, the spring clip spacer 450 serves as a resilient spacer separating the bobbin 430 from the slot 416. The spring clip spacer 450 also biases the bobbin 430 into a centered position within the slot 416. This ensures that the floatation of the bobbin 430 may occur as intended.

Figure 17:
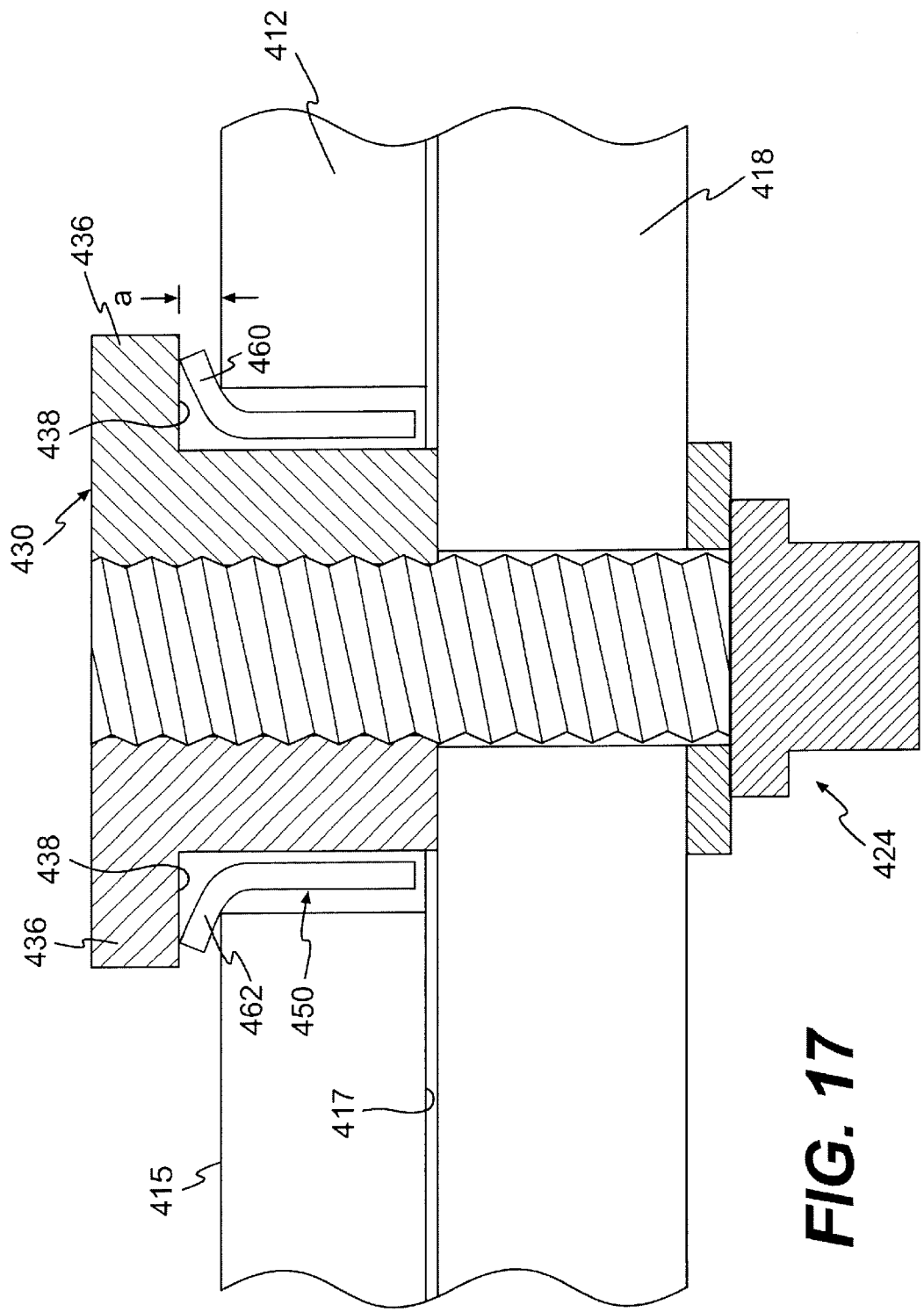
FIG. 17 is an enlarged back view in section of the fastener assembly of FIG. 13 showing the fastener assembly after the rotor has moved axially relative to the hub.

FIG. 17 is an enlarged back view in section of the fastener assembly of FIG. 13 showing the fastener assembly after the rotor 418 has moved axially relative to the hub 412. The axial movement of the rotor 418 relative to the axis of rotation of the hub 412, is an up or down movement of the rotor 418, as it is shown in this figure. The axial movement of the rotor 418 results in the rotor separating momentarily a small amount from the hub 412. This separating is shown by the gap which separates the hub flange inner surface 417 from the rotor 418.

This axial movement also results in the bottom surfaces 438 of the outwardly extending flanges 436 of the bobbin 430 moving toward the hub flange outer surface 415. Floating clearance "a" accommodates this axial movement. The axial movement of the rotor 418 relative to the axis of rotation of the hub 412 is resiliently accommodated by the flange extensions 460 and 462 of the spring clip spacer 450. The flange extensions 460 and 462 preferably must elastically deform to allow for this relative movement. Specifically, the flange extensions 460 and 462 preferably must deflect upwardly toward the bottom surfaces 438 of the bobbin outwardly extending flanges 436. The angle at which the flange extensions 460 and 462 contact the bottom surfaces 438 decreases as the flange extensions 460 and 462 deflect upwardly.

This axial movement of the rotor 418 relative to the hub 412 occurs during thermal expansion/distortion. Axial movement may also occur if the vehicle on which the hub rotor assembly is mounted hits a bump or pothole. In either case, the flange extensions 460 and 462 resiliently return to their original shape as was shown in FIG. 13, biasing the rotor 418 back into engagement with the hub 412.

Figure 18:
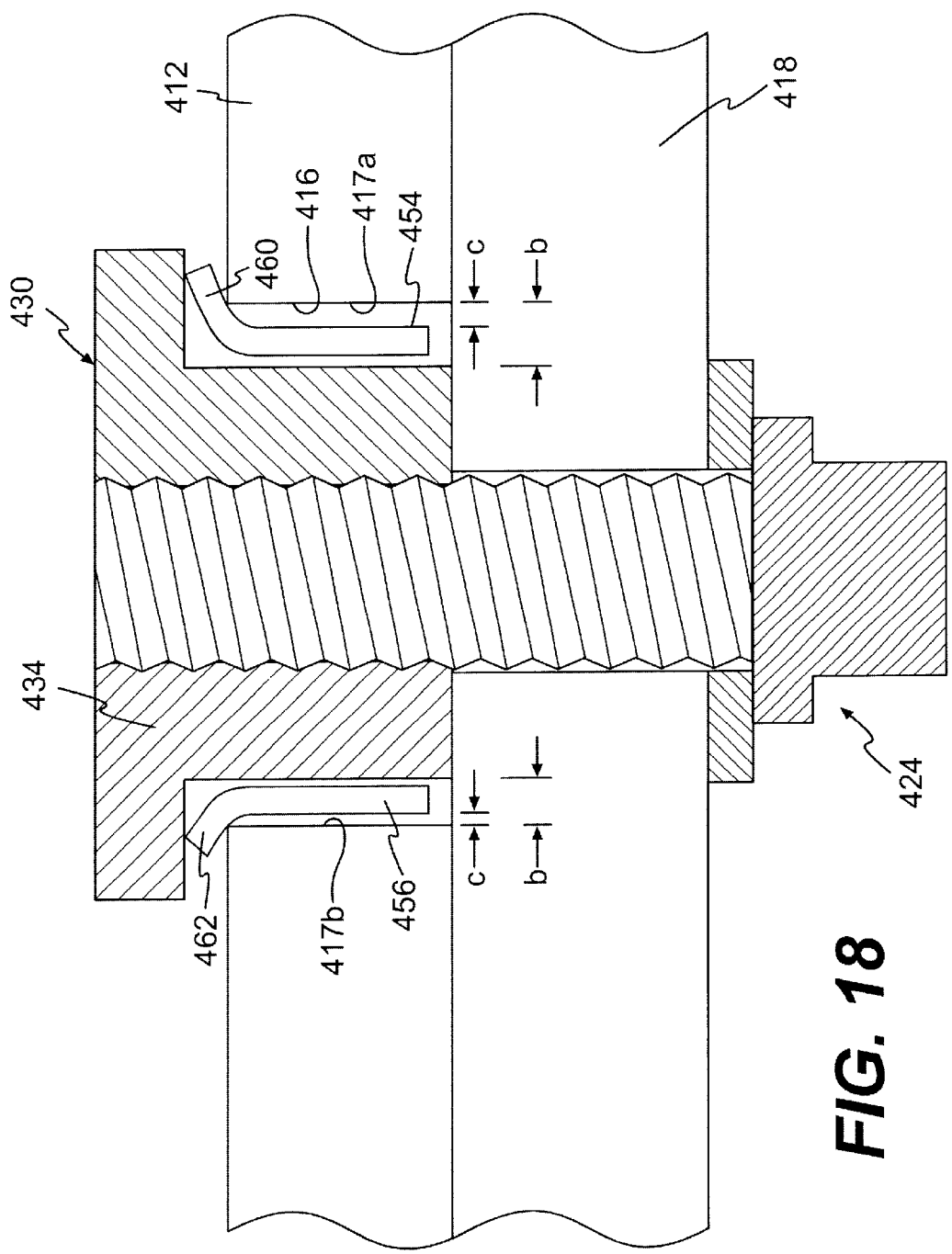
FIG. 18 is an enlarged back view in section of the fastener assembly of FIG. 13 showing the fastener assembly after the rotor has moved radially relative to the hub.

FIG. 18 is an enlarged back view in section of the fastener assembly 424 of FIG. 13 showing the fastener assembly 424 after the rotor 418 has moved rotationally relative to the hub 412. The rotational movement of the rotor 418 relative to the hub 412 and the axis of rotation of the hub is accommodated by floating clearance "c". The rotational movement of the rotor 418 is also resiliently accommodated by the flange extensions 460 and 462 of the spring clip spacer 450. The flange extensions 460 and 462 preferably must elastically deform to allow for this relative movement.

As shown in FIG. 18, the rotor 418 and the attached bobbin 430 have moved to the left relative to the axis of rotation of the hub 412. The right side floating clearance "c" that separates the collar side portion 454 from the slot surface 416a of the slot 416 has widened. Conversely, the left side floating clearance "c" that separates the collar side portion 456 from the slot surface 416b of the slot 416 has narrowed. The flange extension 462 preferably must elastically deform to allow for this relative movement. Specifically, the flange extension 462 preferably must deflect toward the bobbin body 434. The angle at which the flange extension 462 contacts the bottom surface 438 increases during this deflection. The collar side portion 456 is also pushed downwardly toward the rotor 418.

This rotational movement of the rotor 418 relative to the hub 412 occurs due to thermal expansion/distortion, as well from the rotational torque during braking. Upon the ceasing of expansion/distortion or the ceasing of braking, the spring clip spacer resiliently returns to its original shape as was shown in FIG. 13, biasing the rotor 418 into the centered position relative to the slot 416 that was shown in FIG. 13. Radial expansion of the rotor 418 is also permitted. The elongated slots 416 allow the rotor to radially expand. Although slots 416 are shown in a preferred configuration, other slot shapes are contemplated within the scope of the invention. Accordingly, the slots 416 can be round, elongated, closed or open, or other configurations.

Figure 19:
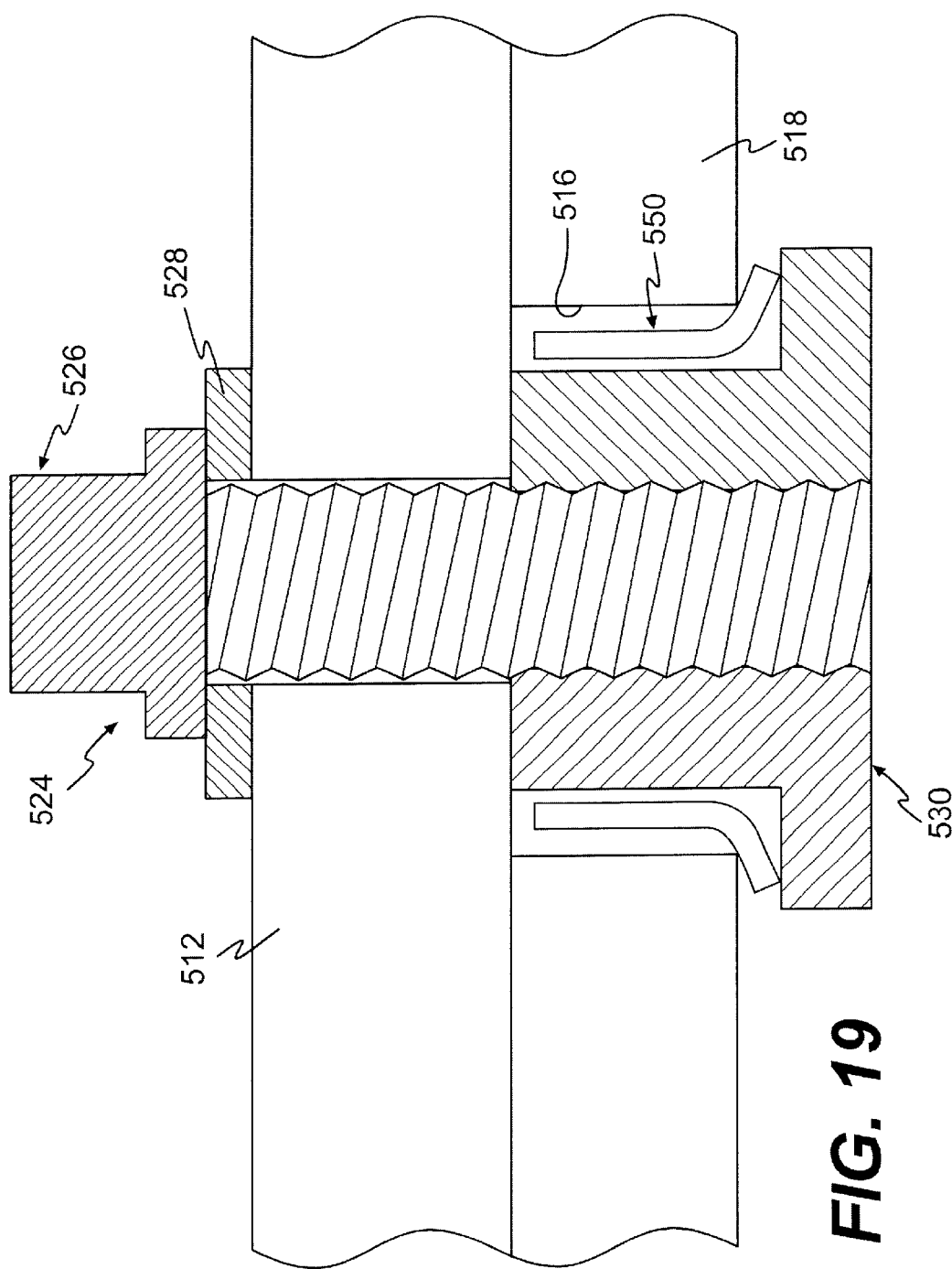
FIG. 19 is an enlarged back view in section of another embodiment of the fastener assembly with a spring clip spacer.
Figure 20A:
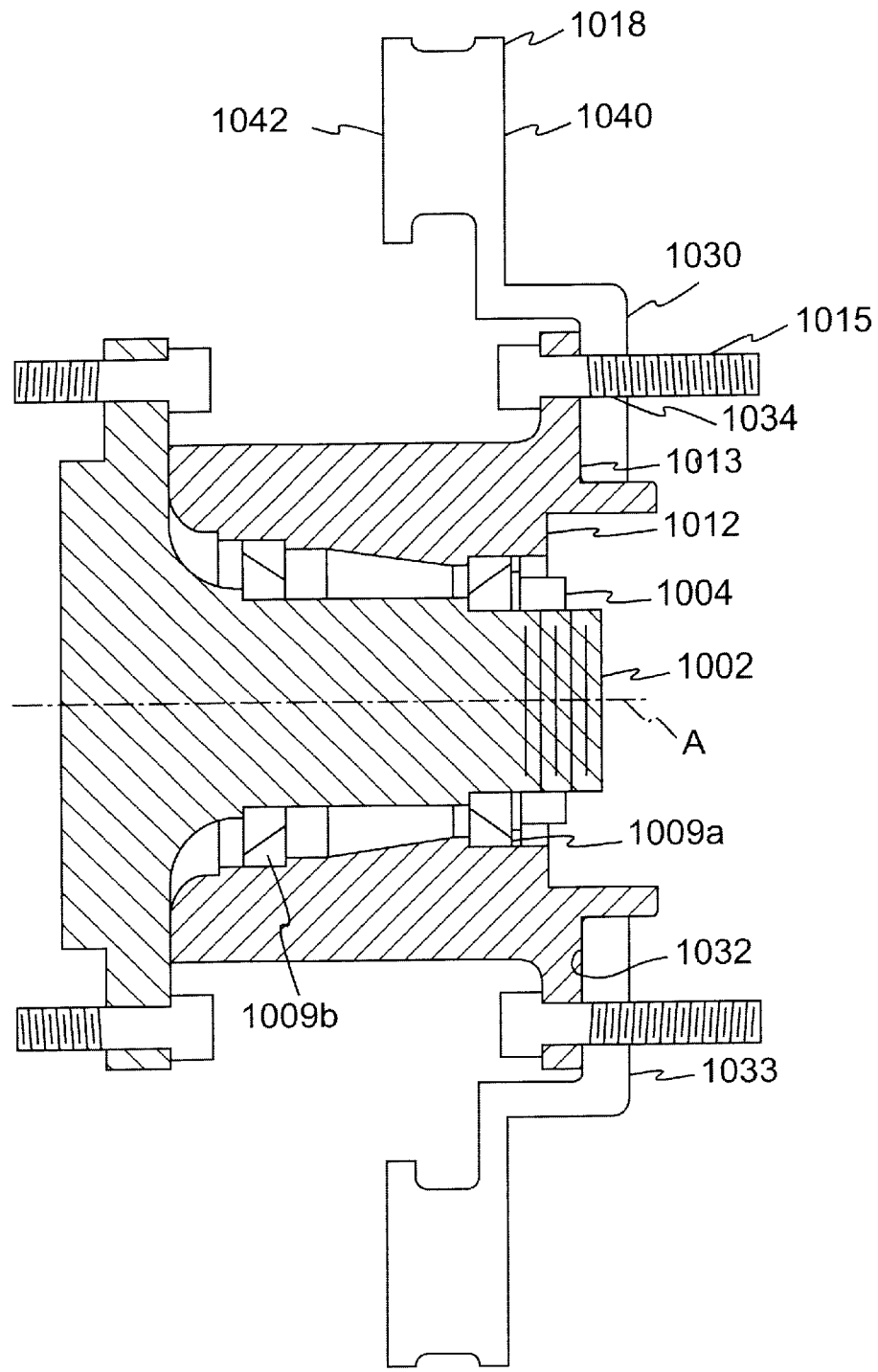
FIG. 20A is a partial side view in section of a prior art hub rotor assembly.
Figure 20B:
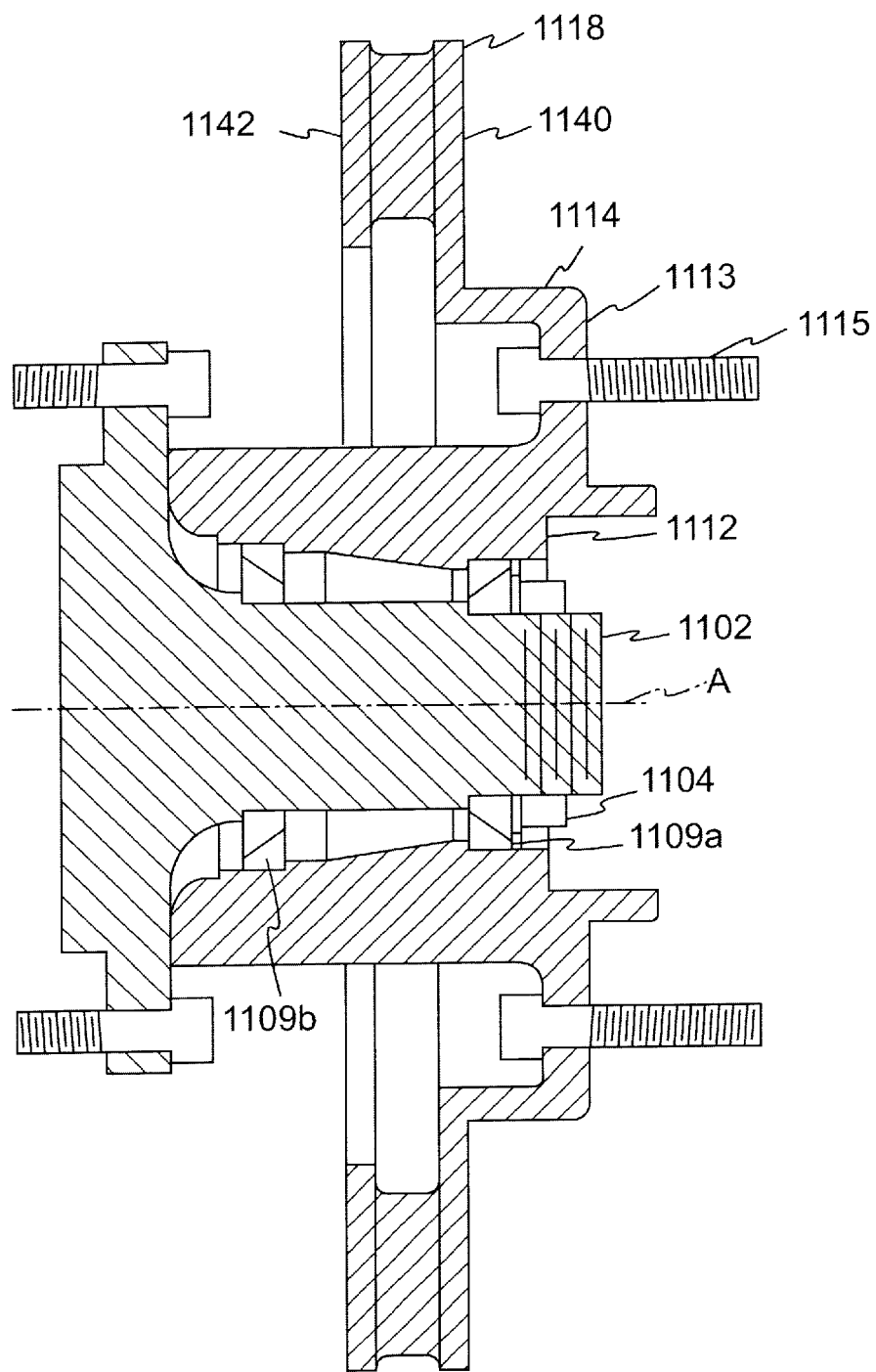
FIG. 20B is a partial side view in section of another prior art hub rotor assembly.

FIG. 19 is an enlarged back view in section of an additional embodiment of the fastener assembly used in embodiments of the hub and rotor assembly of the present invention. FIG. 19 shows a hub 512, a rotor 518 which includes a slot 516, and a fastener assembly 524 that is used to fasten the rotor 518 to the hub 512. The fastener assembly 524 includes a bolt 526, a bobbin 530, a washer 528, and a spring clip spacer 550.

Although the spring clip spacer 450 is shown in two specific embodiments, it is understood that the spring clip spacer is usable in other embodiments of the invention, such as within each of the previous embodiments of the invention shown in FIGS. 5 through 12. It is also understood that the spring clip spacer 450 can be made of any material suitable for commercial braking applications and can be made in various configurations. However, the spring clip spacer 450 is preferably manufactured from corrosion resistant materials such as stainless steel.

It is further understood that FIGS. 13 through 19 show a single fastener assembly which is used to attach a rotor to a hub. It is understood that a plurality of fastener assemblies are used for this purpose, as was shown in FIG. 1. It is further understood that a spring clip spacer could be preferably used with each fastener assembly, or in the alternative, a spring clip spacer could be used with only a portion of the fastener assemblies used to connect the rotor to the hub.

FIGS. 21 through 32 show four additional embodiments of the invention. In each of these embodiments, the rotor mounting flange has been sized so as to accommodate the easy removal of the rotor from the hub. Although the rotor mounting flange is shown as a continuous annular element in each of the embodiments shown previously, as well as those shown in FIGS. 21 through 32, the rotor mounting flange can also be a series of discontinuous tabs.

Figure 21:
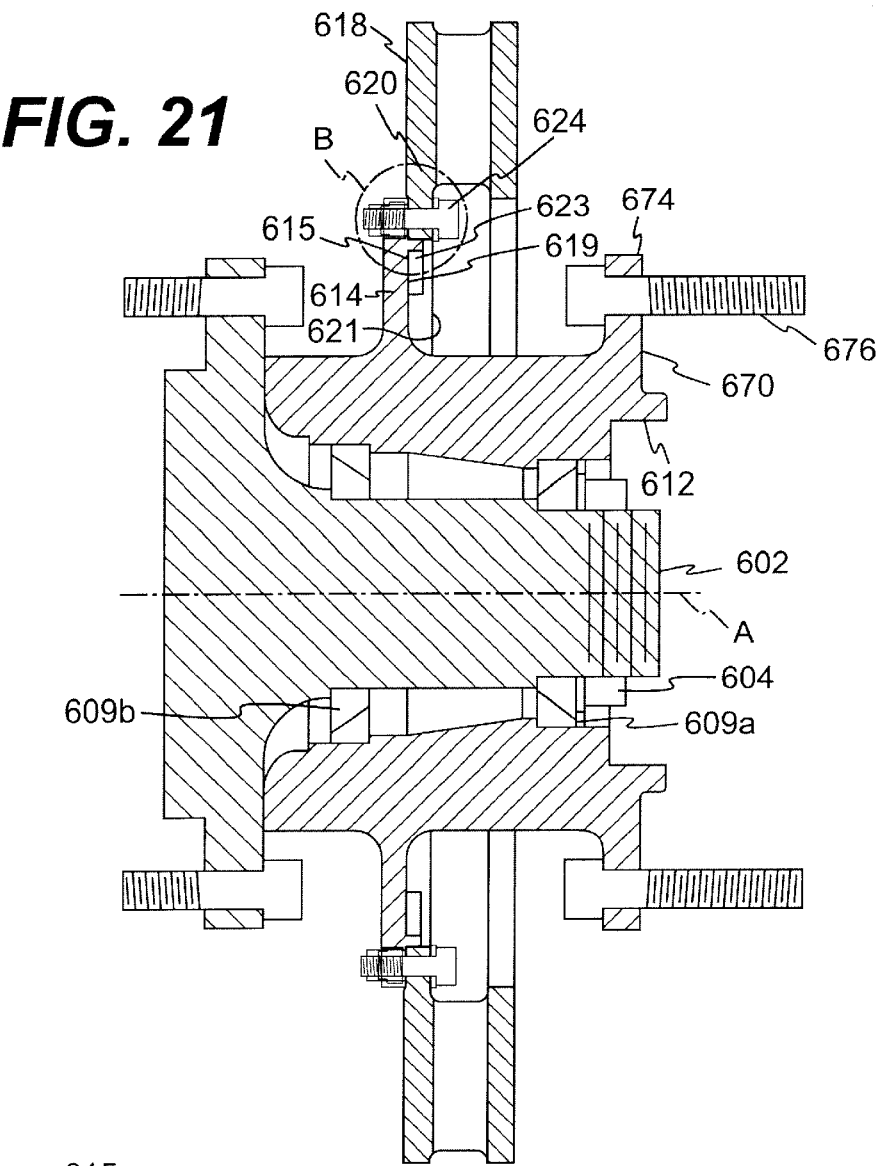
FIG. 21 is a partial side view in section of another embodiment of the rotor and hub fastened together.

FIG. 21 generally shows a shaft 602, a hub 612, which rotates about the shaft 602 through bearings 609a and 609b, a nut 604 securing the hub 612 to the shaft 602, and a rotor 618 connected to the hub 612. The hub 612 includes a wheel mounting flange 670 which includes an outer surface 674, defining the farthest distance on the wheel mounting flange 670 from the axis of rotation "A" and disposed at an outboard end of the hub 612. Wheel studs 676 extend from the wheel mounting flange 670. The wheel mounting flange 670 is typically disposed in a plane that is substantially parallel to the hub axis of rotation "A".

The hub 612 further includes a rotor mounting flange 614 extending outwardly from the exterior surface of the hub 612 and located inboard on the hub 612 with respect to the wheel mounting flange 670. The rotor mounting flange 614 includes a mounting surface 615 against which a flange 620 of the rotor 618 is disposed. Fastener assemblies 624 are used to connect the rotor to the mounting flange. The fastener assemblies shown are modifications of the fastener assemblies as have been shown in FIGS. 13–19. However many other fastener assemblies may be used, including but not limited to previously described embodiments of the fastener assemblies shown in FIGS. 1 to 13, as well as prior art fastener assemblies.

The rotor 618 includes an inner flange surface 621, defining the innermost surface of the rotor 618, and an outer flange surface 619. The diameters of the rotor mounting flange 614, and the rotor flange 620, including the inner flange surface 621, are sized so as to allow the rotor 618 to be easily removed from the hub 612, without requiring the disassembly of the hub 612 from the shaft 602. The diameter of the rotor 618 at the inner flange surfaces 621 exceeds the diameter of the hub 612 at the wheel mounting flange 670 outer surface 674. Accordingly, upon the removal of the fastener assemblies 624, the rotor 618 may be moved outwardly (to the right in FIG. 19) to remove the rotor 618 from the hub 612. No element of the hub 612, including the wheel mounting flange 670, will interfere with the removal of the rotor 618 from the hub 612. This is because the rotor 618 has been sized such that the inner flange surface 621 is larger in diameter than the largest diameter component of the hub that is disposed outboard from the rotor 618 (in this case the hub wheel mounting flange outer surface 674). Outboard of the rotor 618 is defined as away from the vehicle, which is to the right in this figure. This sizing allows the rotor 618 removal to occur without the need to disassemble the hub 612 from the shaft, a task that requires the time consuming re-packing or re-installation of bearings, upon re-assembly.

Figure 22:
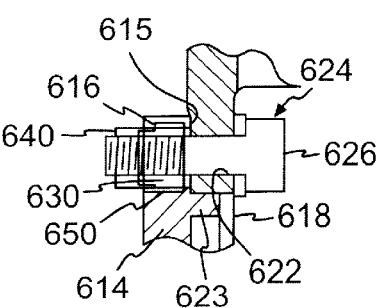
FIG. 22 is an enlarged view of a portion of FIG. 21, shown in circle B, showing the details of the fastener assembly.

FIG. 22 is an enlarged view of a portion of FIG. 21 shown in circle "B" showing the details of the fastener assembly 624. The fastener assembly 624 is a modified embodiment of the fastener assemblies shown in FIGS. 13 through 18. Specifically, FIG. 22 shows the hub rotor mounting flange 614 having a slot 616, and a rotor flange 620 having a passage 622. A bolt 626 passes through the passage and is secured to a bobbin 630 disposed within the slot 616 through the use of a nut 640. A spring clip spacer 650 is disposed around the bobbin 630 in the manner described in the description of FIGS. 13 through 18. The fastener assembly 624 provides floatation of the rotor 618 relative to the hub 612.

Figure 23:
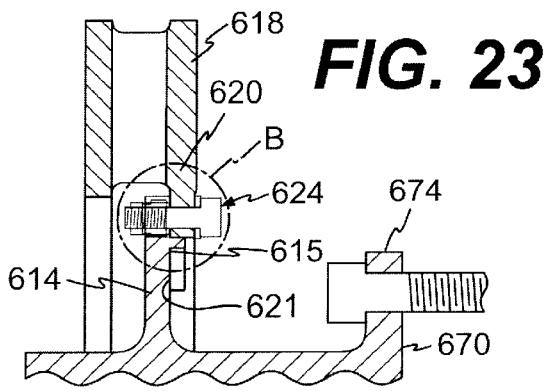
FIG. 23 is a partial side view of an alternate mounting arrangement.

As seen in detail in FIGS. 21–23, hub rotor mounting flange 14 has a guide tab or pilot 623 that protrudes inwardly to abut against the inner diameter of the rotor flange 620. Pilot 623 can be formed as a series of spaced tabs, as seen in FIG. 21, as an annular ring, or as a series of spaced fingers. Any structure that will prevent radial movement between the rotor flange 618 and the hub 612 will be suitable. This is an optional feature that can be used to keep the rotor 618 in axially alignment with the hub 612. This is especially useful to prevent misalignment between the rotor 618 and hub 612 that could occur during the assembly process prior to mounting on a vehicle or due to lateral impact caused by rugged road conditions. However, pilot 623 is not necessary. Pilot 623 is shown in FIGS. 21–23 for purposes of illustration. However, it is understood that pilot 623 could be used in any of the embodiments disclosed herein.

FIG. 23 shows an alternative mounting arrangement in which the rotor mounting flange 614 is secured to the inner surface 621 of the rotor 618.

Figure 24:
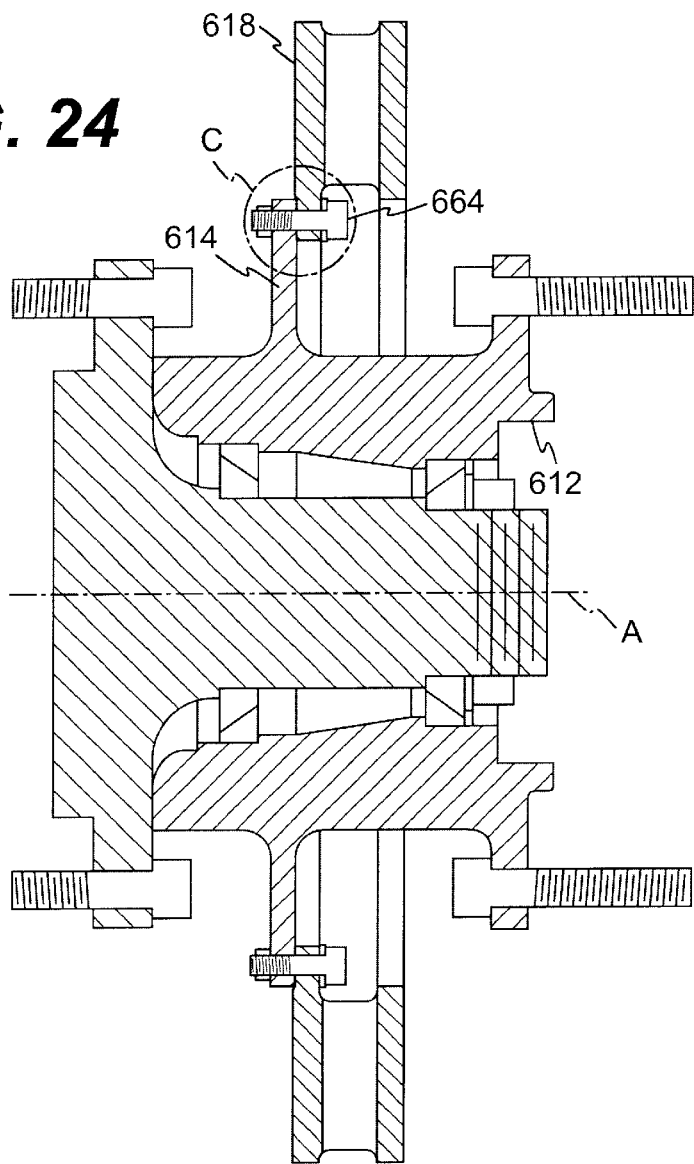
FIG. 24 is a partial side view in section of the rotor and hub fastened together, showing another embodiment of the fastener assembly.
Figure 25:
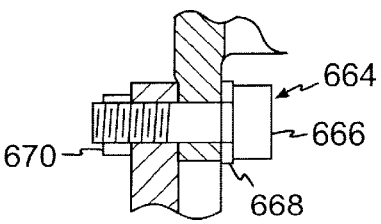
FIG. 25 is an enlarged view of a portion of FIG. 24, shown in circle C, showing the details of the fastener assembly.
Figure 26:
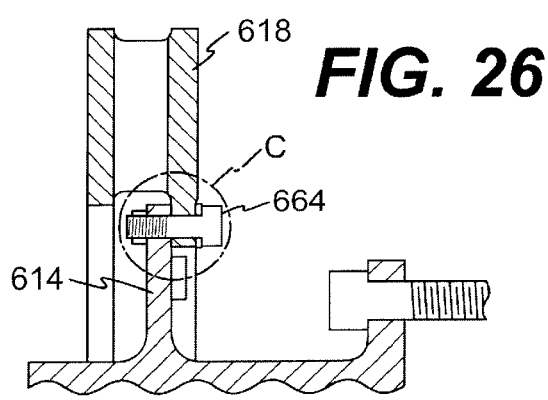
FIG. 26 is a partial side view of an alternate mounting arrangement.

FIG. 24 shows the same arrangement as the embodiment of FIG. 21 with the exception that conventional fastener assemblies 664 are used in place of fastener assemblies, such as are shown in FIG. 13 that allow floatation. FIG. 25 is an enlarged view of a portion of FIG. 24 shown in circle "C" showing the details of the fastener assembly 664. The fastener assemblies include a bolt 666, a washer 668, and a nut 670. FIG. 26 shows the alternate mounting arrangement similar to FIG. 23.

FIG. 27 shows another embodiment of the invention. In this embodiment, the rotor mounting flange 714 is formed as an extension of the wheel mounting flange 770. The hub includes a connecting element 775 extending from the wheel mounting flange 770. The connecting element 775 includes an outer surface 776. The rotor mounting flange 714 extends from the connecting element 775. A pilot 723 is also shown in this embodiment, similar to that shown in FIGS. 21–23, that assists in axial alignment of the hub 712 and the rotor flange 718. The inner surface 721 of the rotor flange 720 has a larger diameter than the exterior surface 776 of the connecting element. Accordingly, after the removal of fastener assemblies 724, the rotor 718 can be easily removed from the hub 712 by simply moving the rotor 718 to the right.

FIG. 28 is an enlarged view of a portion of FIG. 27 shown in circle "D" showing the details of the fastener assembly 724. The fastener assembly 724 is a modified embodiment of the fastener assemblies shown in FIGS. 13 through 18. Specifically, FIG. 28 shows the hub rotor mounting flange 714 having a slot 716, and a rotor flange 720 having a passage 722. A bolt 726 passes through the passage and is secured to a bobbin 730 disposed within the slot 716 through the use of a nut 740. A spring clip spacer 750 is disposed around the bobbin 730 in the manner described in the description of FIGS. 13 through 18. The fastener assembly 724 provides floatation of the rotor 718 relative to the hub 712. FIG. 29 shows the alternate mounting arrangement on the inner surface of the rotor flange 720.

Figure 30:
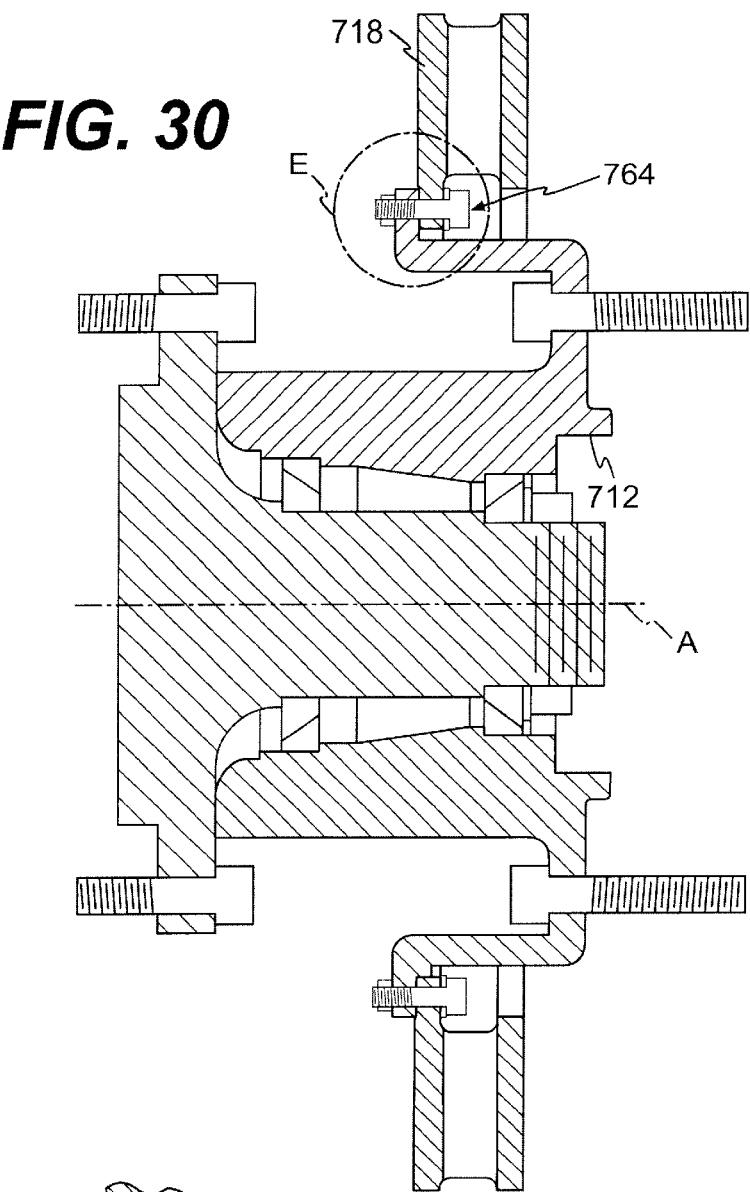
FIG. 30 is a partial side view in section of another embodiment of the rotor and hub assembly fastened together.
Figure 31:
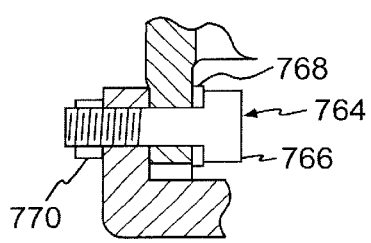
FIG. 31 is an enlarged view of a portion of FIG. 30, shown in circle E, showing the details of the fastener assembly
Figure 32:
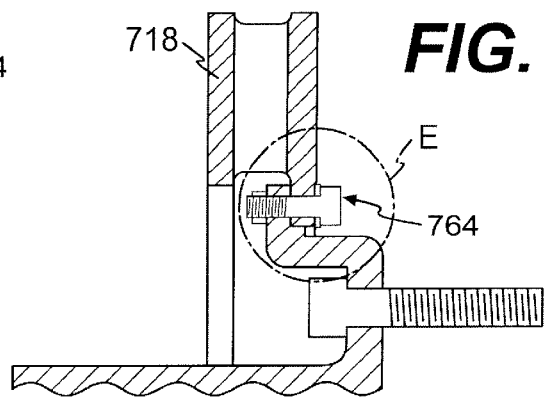
FIG. 32 is a partial side view of an alternate mounting arrangement.

FIG. 30 shows the same arrangement as the embodiment of FIG. 27 with the exception that conventional fastener assemblies 764 are used in place of fastener assemblies, such as are shown in FIG. 13, which allow floatation. FIG. 31 is an enlarged view of a portion of FIG. 30 shown in circle "E" showing the details of the fastener assembly 764. The fastener assemblies include a bolt 766, a washer 768, and a nut 770. FIG. 32 shows the alternate mounting arrangement similar to that shown in FIG. 29.

In each of the embodiments shown in FIGS. 21 through 32, fastener assemblies are preferably disposed such that the bolt heads are facing outwardly from the vehicle (to the right in this figure) to accommodate easy removal. Other configurations are also possible. Other rotor flange configurations are also possible. However, it is preferable that the rotor mounting flange is sized larger than other hub elements outbound of the rotor, so that no element will interfere with the removal of the rotor from the hub. Similarly, other hub configurations are possible that preferably provide the easy removal of the rotor from the hub.

The design of the components, especially with respect to their interrelation and associated clearances, is optimized based on state of the art finite element analysis to enhance braking performance and increase the life of the hub and rotor. The design results in reduced vibrations and judder. Also, manufacturing tooling, rotor replacement and maintenance costs are reduced. Heat transfer from the rotor to the hub is also minimized by the design of the present invention. The effects of mounting a rim improperly though uneven tightening of lug nuts and the effects of mounting an improperly manufactured rim are also minimized by the design of the present invention.

While advantageous embodiments have been chosen to illustrate the invention, it will be understood by those skilled in the art that various changes and modifications can be made therein without departing from the scope of the invention.

What is claimed is:

1. A hub rotor assembly comprising:
   a hub;
   a rotor supported by the hub for rotation about a central axis;
   a plurality of slots disposed in one of the hub and the rotor;
   a plurality of floatation elements connecting the rotor to the hub, the plurality of floatation elements being fixed with respect to the other of the hub and the rotor, each floatation element including a portion being disposed at least partially within one of the slots, the portion of each floatation element being disposed within one of the slots including a non-circular cross section, each floatation element being sized in relation to the slot within which it is disposed to allow at least one of radial, axial, or rotational relative movement between the floatation element and the slot, the relative movement between each floatation element and the slot within which it is disposed permitting relative movement between the rotor and the hub with respect to the central axis;
   wherein each of the plurality of floatation elements comprises a bobbin and a bolt used in association with each bobbin, the bolt being connected to the bobbin to connect the rotor to the hub; and
   a deformable spring disposed between at least one floatation element and the slot within which it is disposed, the deformable spring being configured to deform during relative movement between the rotor and the hub.

2. The hub rotor assembly of claim 1, wherein the rotor has a mounting flange with an inner diameter, and the hub has a mounting flange, wherein the rotor mounting flange and the hub mounting flange overlap so that the floatation elements extend through the mounting flanges to connect the rotor to the hub.

3. The hub rotor assembly of claim 2, wherein the hub mounting flange has a pilot formation extending axially and abutting the inner diameter of the rotor mounting flange such that the rotor is held in axial alignment with the hub.

4. The hub rotor assembly of claim 2, wherein the hub has a wheel mounting flange with an outer diameter and an aperture therein that receives a wheel mounting fastener, and wherein the inner diameter of the rotor mounting flange is greater than the outer diameter of the wheel mounting flange.

5. The hub rotor assembly of claim 1, wherein the at least one spring includes a clip portion constructed to secure the spring to the bobbin, and at least one spring portion extending from the clip portion.

6. The hub rotor assembly of claim 5, wherein:
   the bobbin includes a tubular body and an enlarged head; and
   the at least one spring portion comprises two opposing deformable flanges extending angularly from the clip portion, the deformable flanges being disposed adjacent to the bobbin enlarged head.

7. The hub rotor assembly of claim 1, wherein the portion of the floatation element disposed within the slot has a polygonal outer surface.

8. The hub rotor assembly of claim 1, wherein the hub is rotatable and supports the rotor for rotation.

9. The hub rotor assembly of claim 1, wherein:
   one of the hub and the rotor includes a flange, the plurality of slots being disposed therein; and
   one of the plurality of floatation elements is retained in each slot.

10. The hub rotor assembly of claim 1, wherein:
    one of the hub and the rotor includes a flange, the plurality of slots being disposed therein;
    the other of the hub and the rotor includes a flange with a plurality of openings being disposed therein; and
    one bolt is received in each opening.

11. The hub rotor assembly of claim 1, wherein the bobbin has internal threads and the bolt is threadably engaged with the bobbin.

12. The hub rotor assembly of claim 1 wherein:
    each slot has a width;
    each bobbin has a tubular portion disposed in a slot, the tubular portion having a width less than the width of the slot within which it is disposed; and
    the deformable spring is disposed between the bobbin tubular portion and the slot.

13. The hub rotor assembly of claim 1, wherein:
    one of the hub and the rotor has a flange having a thickness, the plurality of slots being disposed therein;
    each bobbin has a tubular portion disposed in a slot, the tubular portion having a length greater than the thickness of the flange and an enlarged head disposed at an end of the tubular portion opposite the bolt in a position outside the slot; and
    the deformable spring is disposed between the bobbin head and the flange.

14. The hub rotor assembly of claim 1, in combination with a vehicle having a gross vehicle weight of 5000 pounds or more.

15. The hub rotor assembly of claim 1, wherein the deformable spring is constructed from a corrosion resistant material.

16. The hub rotor assembly of claim 1, wherein the deformable spring is constructed from stainless steel.

17. The hub rotor assembly of claim 1, wherein the deformable spring substantially surrounds the portion of floatation element being disposed at least partially within one of the slots.

18. A hub rotor assembly comprising:

a hub;

a rotor supported by the hub for rotation about a central axis;

a plurality of slots disposed in one of the hub and the rotor, each slot having a width and a depth;

a plurality of floatation elements connecting the rotor to the hub, the plurality of floatation elements being fixed with respect to the other of the hub and the rotor, each floatation element including a first portion being disposed at least partially within one of the slots and a second portion being disposed outside the slot, the second portion having a width greater than the width of the slot, each floatation element being sized in relation to the slot within which it is disposed to allow at least one of radial, axial, or rotational relative movement between the floatation element and the slot, the relative movement between each floatation element and the slot within which it is disposed permitting relative movement between the rotor and the hub with respect to the central axis; and a deformable spring disposed between at least one floatation element and the slot within which it is disposed, the deformable spring being configured to deform during relative movement between the rotor and the hub, the deformable spring having a first portion between the floatation element first portion and the slot and a second portion disposed outside the slot at a position adjacent to the floatation element second portion, wherein the deformable spring first and second portions are integral with each other.

19. The hub rotor assembly of claim 18, wherein:

each of the plurality of floatation elements comprises a bobbin; and a bolt used in association with each bobbin, the bolt being connected to the bobbin to connect the rotor to the bulb.

20. The hub rotor assembly of claim 19, wherein the at least one spring includes a clip portion constructed to secure the spring to the bobbin, and at least one spring portion extending from the clip portion.

21. The hub rotor assembly of claim 20, wherein:

the bobbin includes a tubular body and an enlarged head; and the at least one spring portion comprises two opposing deformable flanges extending angularly from the clip portion, the deformable flanges being disposed adjacent to the bobbin enlarged head.

22. The hub rotor assembly of claim 19, wherein:

one of the hub and the rotor has a flange having a thickness, the plurality of slots being disposed therein;

each bobbin first portion is tubular, the tubular portion being disposed in a slot, the tubular portion having a length greater than the thickness of the hub flange and an enlarged head disposed at an end of the tubular portion opposite the bolt in a position outside the slot; and the deformable spring is disposed between the bobbin head and the hub flange.

23. The hub rotor assembly of claim 20, wherein the first portion of the bobbin has a polygonal outer surface.

24. The hub rotor assembly of claim 19, wherein the bobbin has internal threads and the bolt is threadably engaged with the bobbin.

25. The hub rotor assembly of claim 19, wherein:

each slot has a width;

each bobbin first portion is tubular, the tubular portion being disposed in a slot, the tubular portion having a width less than the width of the slots within which it is disposed; and the deformable spring is disposed between the bobbin tubular portion and the slot.

26. The hub rotor assembly of claim 19, wherein:

one of the hub and the rotor includes a flange, the plurality of slots being disposed therein;

the other of the hub and the rotor includes a flange with a plurality of openings being disposed therein; and one bolt is received in each opening.

27. The hub rotor assembly of claim 18, wherein the rotor has a mounting flange with an inner diameter, and the hub has a mounting flange, wherein the rotor mounting flange and the hub mounting flange overlap, so that the floatation elements extend through the mounting flanges to connect the rotor to the hub.

28. The hub rotor assembly of claim 27, wherein the hub mounting flange has a pilot formation extending axially and abutting the inner diameter of the rotor mounting flange such that the rotor is held in axial alignment with the hub.

29. The hub rotor assembly of claim 27, wherein the hub has a wheel mounting flange with an outer diameter and an aperture therein that receives a wheel mounting fastener, and wherein the inner diameter of the rotor mounting flange is greater than the outer diameter of the wheel mounting flange.

30. The hub rotor assembly of claim 18, the hub is rotatable and supports the rotor for rotation.

31. The hub rotor assembly of claim 18, wherein:

one of the hub and the rotor includes a flange, the plurality of slots being disposed therein; and one of the plurality of floatation elements is retained in each slot.

32. The hub rotor assembly of claim 18, in combination with a vehicle having a gross vehicle weight of 5000 pounds or more.

33. The hub rotor assembly of claim 18, wherein the deformable spring is constructed from a corrosion resistant material.

34. The hub rotor assembly of claim 18, wherein the deformable spring is constructed from stainless steel.

35. The hub rotor assembly of claim 18, wherein the deformable spring substantially surrounds the portion of floatation element being disposed at least partially within one of the slots.

36. A hub rotor assembly comprising:

a hub having a central axis of rotation and inboard end for attachment to a vehicle support and an outboard end for attachment to a wheel, the hub including, a wheel mounting flange disposed at the outboard end and a rotor mounting flange axially spaced from the outboard end toward the inboard end and extending generally parallel to the wheel mounting flange;

wherein the wheel mounting flange has an outer periphery spaced a first radial distance from the axis of rotation, wherein the rotor mounting flange has an outer periphery spaced a second radial distance from the axis of rotation, the second radial distance being greater than the first radial distance;

a rotor including a rotor flange fastened to the rotor mounting flange of the hub, the rotor flange having an inner periphery defining a third radial distance from the axis of rotation, wherein the third radial distance is greater than the first radial distance and less than the second radial distance; and a plurality of fasteners that connect the rotor flange to the rotor mounting flange of the hub.

37. The hub rotor assembly each of claim 36, wherein the plurality of fasteners that connect the rotor to the hub include a floatation element which allow movement of the rotor relative to the hub with respect to the central axis.

38. The hub rotor assembly of claim 37, wherein at least one of the plurality of fasteners include a deformable spring constructed and arranged to deform during movement of the rotor relative to the hub with respect to the central axis.

39. The hub rotor assembly of claim 36, wherein:

the hub includes a connecting element having a first and second end, the first end disposed on the hub proximate to the wheel mounting flange, the connecting element extending toward the inboard end of the rotor; and the rotor mounting flange is connected to the hub at the connecting element second end.

40. The hub rotor assembly of claim 34, wherein the connecting element is disposed substantially perpendicular to the wheel mounting flange.

41. The hub rotor assembly of claim 36, wherein:

the rotor mounting flange of the hub includes a plurality of openings and the rotor flange includes a plurality of openings, the rotor mounting flange openings and rotor flange openings being arranged for alignment; and the plurality of fasteners connect the rotor flange to the rotor mounting flange.

42. The hub rotor assembly of claim 36, in combination with a vehicle having a gross vehicle weight of 5000 pounds or more.

43. The hub rotor assembly of claim 36 the rotor mounting flange of the hub has a pilot formation extending axially and abutting the inner periphery of the rotor flange such that the rotor is held in axial alignment with the hub.

44. A hub rotor assembly comprising:

a hub having a central axis; of rotation and inboard end and an outboard end, the hub including a wheel mounting flange disposed at the outboard end and a rotor mounting flange axially spaced from and parallel to the wheel mounting flange toward the inboard end, wherein, the wheel mounting flange has an outer periphery having a first radial distance from the axis of rotation and the rotor mounting flange has an outer periphery having a second radial distance from the axis of rotation, the second radial distance being greater than the first radial distance;

a rotor including a rotor flange attached to the rotor mounting flange of the hub, the rotor flange having an inner periphery defining the closest position on the rotor flange from the axis of rotation and a third radial distance, the third radial distance being greater than the first radial distance and less than the second radial distance a plurality of fasteners that connect the rotor flange to the rotor mounting flange of the hub and allow movement of the rotor relative to the hub with respect to the central axis; and a deformable spring disposed between at least one fastener and one of the hub and the rotor, the spring being constructed and arranged to deform during relative movement of the rotor relative to the hub.

45. The hub rotor of claim 44, wherein each of the plurality of fasteners includes a floatation element.

46. The hub rotor of claim 44, wherein the rotor mounting flange of the hub includes a pilot formation that abuts the inner periphery of the rotor flange.

* * * * *